(12) United States Patent
Clark

(10) Patent No.: US 9,947,003 B2
(45) Date of Patent: Apr. 17, 2018

(54) SYSTEMS AND METHODS FOR USING GESTURES IN FINANCIAL TRANSACTIONS ON MOBILE DEVICES

(71) Applicant: MasterCard International Incorporated, Purchase, NY (US)

(72) Inventor: Kyle Patrick Clark, High Ridge, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 73 days.

(21) Appl. No.: 14/223,635

(22) Filed: Mar. 24, 2014

(65) Prior Publication Data
US 2015/0269555 A1    Sep. 24, 2015

(51) Int. Cl.
G06Q 20/32     (2012.01)
G06F 3/0488    (2013.01)

(52) U.S. Cl.
CPC ..... *G06Q 20/3221* (2013.01); *G06F 3/04883* (2013.01); *G06Q 20/322* (2013.01)

(58) Field of Classification Search
None
See application file for complete search history.

(56) References Cited

U.S. PATENT DOCUMENTS

| | | | |
|---|---|---|---|
| 8,544,729 B2 | 10/2013 | Aidasani et al. | |
| 2009/0089176 A1* | 4/2009 | McCabe | G06Q 20/10 705/26.1 |
| 2011/0251954 A1 | 10/2011 | Chin | |
| 2011/0273380 A1 | 11/2011 | Martin | |
| 2011/0282785 A1* | 11/2011 | Chin | G06F 3/04883 705/42 |
| 2012/0081282 A1 | 4/2012 | Chin | |
| 2012/0254032 A1 | 10/2012 | Carbonell et al. | |
| 2013/0066749 A1* | 3/2013 | Cooke | G06F 3/017 705/27.2 |
| 2013/0104022 A1* | 4/2013 | Coon | G06F 17/243 715/226 |
| 2013/0179336 A1 | 7/2013 | Lyons et al. | |

(Continued)

OTHER PUBLICATIONS

"Mouse is Leaving This Pad" by Claudine Beaumont and Matt Warman of The London Daily Telegraph, Star-Phoenix, Dec. 12, 2008, p. C12.*

*Primary Examiner* — Alexander G Kalinowski
*Assistant Examiner* — Blane A Lickteig
(74) *Attorney, Agent, or Firm* — Armstrong Teasdale LLP

(57) ABSTRACT

A computer-implemented method for providing cardholder account information in response to gestures at a mobile computing device to facilitate a payment transaction is implemented by a mobile computing device coupled to a memory. The method includes receiving a first haptic gesture associated with a financial transaction, providing a plurality of payment method options retrieved from a data repository based upon the first haptic gesture, receiving a second haptic gesture comprising a payment method selection selected from the plurality of payment method options, and providing a plurality of cardholder account information for the financial transaction, the plurality of cardholder account information provided based at least in part on the payment method selection.

11 Claims, 14 Drawing Sheets

(56) References Cited

U.S. PATENT DOCUMENTS

2013/0191789 A1* 7/2013 Calman ................ G06F 3/017
715/863
2013/0297425 A1 11/2013 Wallaja
2014/0173407 A1* 6/2014 Kruglick ............ G06F 17/276
715/226
2014/0258828 A1* 9/2014 Lymer ................ G06F 17/243
715/224

* cited by examiner

SYSTEMS AND METHODS FOR USING GESTURES IN FINANCIAL TRANSACTIONS ON MOBILE DEVICES

BACKGROUND OF THE DISCLOSURE

The field of the disclosure relates generally to payment transactions on mobile devices, and more particularly, to systems and methods for using gestures to facilitate payment transactions with online merchants on mobile computing devices.

In at least some cardholder-initiated financial transactions, the cardholder (e.g., an entity using a payment card such as a credit card, a debit card, or a prepaid card) may purchase or return goods or services from a merchant using computer-based resources associated with the merchant ("merchant applications"). The merchant applications may include, for example, merchant websites, merchant sponsored computer applications, and third-party websites or computer applications that facilitate payment transactions between a cardholder and the merchant. In at least some examples, the cardholder may purchase or return goods or services at such merchant applications using a mobile computing device such as a tablet computer, a smart phone, a phablet, or any other suitable mobile computing device. Providing cardholder account information associated with the payment transaction on such mobile computing devices is time-consuming, tedious, and prone to human error. A system is needed that helps to provide cardholder account information at a mobile computing device to facilitate financial transactions.

BRIEF DESCRIPTION OF THE DISCLOSURE

In one aspect, a computer-implemented method for providing cardholder account information in response to gestures at a mobile computing device to facilitate a payment transaction is provided. The method is implemented by a mobile computing device coupled to a memory. The method includes receiving a first haptic gesture associated with a financial transaction, comparing the first haptic gesture to at least one command gesture retrieved from a data repository to identify a plurality of payment method options, providing the plurality of payment method options retrieved from the data repository based upon the first haptic gesture, receiving a second haptic gesture comprising a payment method selection selected from the plurality of payment method options, and providing a plurality of cardholder account information for the financial transaction, the plurality of cardholder account information provided based at least in part on the payment method selection.

In another aspect, a mobile computing device for providing cardholder account information in response to gestures to facilitate a payment transaction is provided. The mobile computing device includes a processor, and a memory coupled to the processor. The mobile computing device is configured to receive a first haptic gesture associated with a financial transaction, compare the first haptic gesture to at least one command gesture retrieved from a data repository to identify a plurality of payment method options, provide the plurality of payment method options retrieved from a data repository based upon the first haptic gesture, receive a second haptic gesture comprising a payment method selection selected from the plurality of payment method options, and provide a plurality of cardholder account information for the financial transaction, the plurality of cardholder account information provided based at least in part on the payment method selection.

In a further aspect, computer-readable storage media for providing cardholder account information in response to gestures at a mobile computing device to facilitate a payment transaction is provided. The computer-readable storage media has computer-executable instructions embodied thereon. When executed by at least one processor, the computer-executable instructions cause the processor to receive a first haptic gesture associated with a financial transaction, compare the first haptic gesture to at least one command gesture retrieved from a data repository to identify a plurality of payment method options, provide the plurality of payment method options retrieved from a data repository based upon the first haptic gesture, receive a second haptic gesture comprising a payment method selection selected from the plurality of payment method options, and provide a plurality of cardholder account information for the financial transaction, the plurality of cardholder account information provided based at least in part on the payment method selection.

BRIEF DESCRIPTION OF THE DRAWINGS

The figures listed below show example embodiments of the methods and systems described herein.

FIG. 1 is a schematic diagram illustrating an example multi-party payment card industry system for enabling ordinary payment-by-card transactions, including payment-by-card transactions initiated by cardholders using mobile computing devices in communication with an online merchant, in which merchants and card issuers do not necessarily have a one-to-one relationship.

FIG. 2 is an expanded block diagram of an example embodiment of server architecture used in payment transactions in accordance with one example embodiment of the present disclosure.

FIG. 3 illustrates an example configuration of a mobile computing device shown in FIGS. 1 and 2 used for providing cardholder account information in response to gestures at a mobile computing device to facilitate a payment transaction.

FIG. 4 illustrates an example configuration of a server system such as the online merchant shown in FIG. 1, configured to interact with the mobile computing device of FIG. 3.

FIG. 5 is a simplified data flow diagram of an example mobile computing device providing cardholder account information in response to gestures to facilitate a payment transaction.

FIG. 6 is a simplified diagram of an example method of providing cardholder account information in response to gestures at the mobile computing device of FIG. 3 to facilitate a payment transaction.

FIG. 7 is a diagram of components of one or more example computing devices that may be used in the environment shown in FIG. 5.

FIG. 8-14 illustrate example screenshots displayed on a mobile computing device used for facilitating a payment transaction at an electronic merchant wherein the mobile computing device provides cardholder account information in response to gestures inputted into the mobile computing device.

Figure 1:
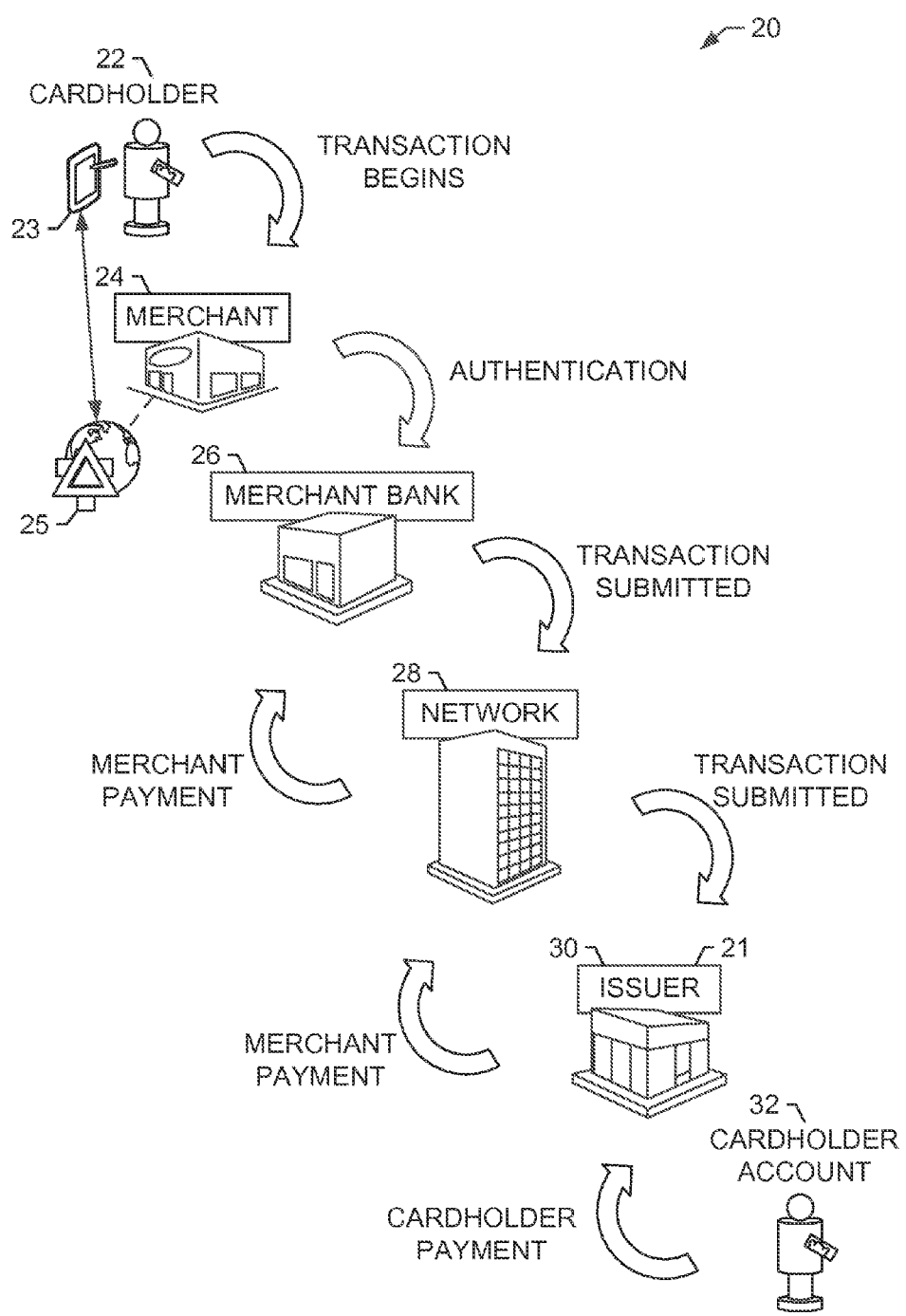
FIGS. 1-14 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

Described herein are computer systems such as mobile computing devices and online merchant servers. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, "gestures" refer to any combination of inputs that may be received by a computing system such as the mobile computing device described herein. Gestures may accordingly include combinations of haptic inputs, keystrokes, rotations or movement of a computing device detected through a gyroscope or accelerometer, audio and video input, and any other suitable input. Accordingly, gestures refer generally to combinations of inputs received by the mobile computing device from a user such as a cardholder.

As used herein, "financial transactions" refers to any transaction of currency, electronic currency, assets, or anything else of value in exchange for goods, services or other currency or assets. More specifically, as used herein, financial transactions may refer to payment transactions wherein a user such as a cardholder provides currency or electronic currency in exchange for goods or services. In at least one example, such financial transactions may include a cardholder interacting with a merchant over an electronic commerce site or an electronic commerce application in order to purchase goods or services. In at least this example, financial transactions may also be referred to as electronic commerce transactions.

The subject matter described herein relates generally to performing payment transactions on mobile devices, and more particularly, to systems and methods for using gestures to initiate payment transactions with online merchants on mobile computing devices. Specifically, the methods and systems described herein include (i) receiving, at the mobile computing device, a first haptic gesture associated with a financial transaction; (ii) providing a plurality of payment method options retrieved from a data repository based upon the first haptic gesture; (iii) receiving, at the mobile computing device, a second haptic gesture comprising a payment method selection selected from the plurality of payment method options; and (iv) providing a plurality of cardholder account information for the financial transaction, the plurality of cardholder account information provided based at least in part on the payment method selection.

The systems and methods described herein facilitate initiating payment transactions with online merchants on mobile computing devices by allowing a cardholder to provide cardholder account information based upon gestures initiated by the cardholder at the mobile computing device. Using gestures rather than manually inputting cardholder account information significantly avoids time consuming steps of individually selecting and entering data. Further, as described herein, using gestures on a local data repository allows for enhanced security of cardholder account information, particularly in comparison to storage with an online merchant or third-party.

In at least some cardholder-initiated financial transactions, the cardholder (e.g., an entity using a payment card such as a credit card, a debit card, or a prepaid card) may purchase or return goods or services (collectively referred to herein as "products") from a merchant at an online presence associated with a merchant ("online merchant"). In many examples, the cardholder conducts the financial transaction at the online merchant using a mobile computing device such as, for example, a laptop, a tablet computer, a smart phone, a hybrid of a phone and tablet ("phablet"), and any other similar device. In at least several examples, the cardholder uses an application ("mobile application") on the mobile computing device to interact with the online merchant. The mobile application may include, for example and without limitation, a mobile web browser, a mobile application for shopping or commerce, and a mobile application for a particular online merchant ("merchant application").

In a typical example, the cardholder uses the mobile application to identify a product or products that the cardholder wishes to purchase. Once the products are identified for purchase, the cardholder navigates to application content, such as a webpage or a screen, to purchase the products. Such application content may be referred to as a "checkout module" because it allows the cardholder to functionally "check out" the products for purchase. The checkout module may include any content displayed on the mobile computing device that allows the cardholder to finalize the purchase of the products by, for example, providing cardholder account information (such as transaction card information).

In most examples, the checkout module includes a first set of purchase information. The first set of purchase information recites information associated with the products identified for purchase including, for example and without limitation, product names, product codes or identifiers, product prices, and charges or fees associated with taxes, shipping, and handling of the products.

The checkout module also includes a payment component. The payment component is configured to receive information from the mobile computing device indicating how the identified products will be paid for. The payment component includes a plurality of payment fields. The cardholder provides information (such as cardholder account information) at the payment fields to facilitate the financial transaction.

More specifically, the plurality of payment fields may include a payment type field. The payment type field is configured to allow a cardholder to input or select a payment type including, for example, payment by credit card, payment by debit card, payment by check, payment by electronic currency, and payment by wire. The plurality of payment fields may further include a transaction card type field (i.e., identifying a particular payment network or transaction card vendor), a transaction card number field, an expiration date field, and a security code field. In at least some examples, the transaction card type field may be associated with a particular format of transaction card numbers and the security code field may be associated with a particular security code format. In such examples, the associated payment fields may be configured to detect when received input complies with such formats and to alternately show an error or message when input does not comply with such formats.

The checkout module may additionally include a billing component. The billing component includes billing fields related to billing of the purchase. More specifically, these billing fields may include at least one address field associated with the address of the cardholder, a city or municipality field associated with the city or municipality of the cardholder, a state or province field associated with the state or province of the cardholder, a postal code field associated with the postal code of the cardholder, and a country field associated with the country of the cardholder.

Although payment fields and billing fields are identified and discussed separately, they are processed together by the account information application. Accordingly, payment fields and billing fields may be also discussed interchangeably and may alternately be referred to as "transaction fields."

In some examples, a cardholder manually provides information as an input to each of the plurality of payment fields and each of the plurality of billing fields. As numerous payment fields and billing fields require input, completing purchases on mobile computing devices may be time-consuming and error-prone for cardholders. In other examples, the cardholder may store information associated with a particular transaction card with a particular merchant. When interacting with that online merchant, the cardholder selects the particular transaction card for use, thus expediting the purchase. However, storing cardholder account information at an online merchant may carry risk for the security and privacy of the cardholder account. Accordingly, methods and systems for initiating payment transactions with online merchants on mobile computing devices are desirable.

In the systems and methods described herein, a cardholder account information application ("account information application") is installed on the mobile computing device. The account information application is stored in the memory of the mobile computing device and executed on the processor of the mobile computing device. The account information application is supported by a plurality of mobile computing devices and a plurality of operating systems. For example, the account information application may be installed and executed with iOS™ Android™, BlackBerry™, Windows Phone™, and any other available operating system. (iOS is a trademark of Apple of Cupertino, Calif., BlackBerry is a trademark of BlackBerry Limited of Waterloo, Ontario, Windows Phone is a trademark of Microsoft of Redmond, Wash., and Android is a trademark of Google of Mountain View, Calif.). When executed, the account information application may interact with other applications in the manner described herein. In the example embodiment, the account information application runs as a "background process" as other applications are simultaneously used by a cardholder. For example, although a cardholder may be using a different application on the mobile computing device (such as a web browser), the cardholder may provide inputs (e.g., gestures) as described below and cause the mobile computing device to retrieve and provide cardholder account information. In other words, the account information application is stored and executed such that inputs (such as haptic gestures) are detected at the operating system layer and passed to other applications. The account information application accordingly allows a cardholder to provide and update cardholder account information when the cardholder is using any application provided by the mobile computing device. Further, the account information application allows a cardholder to conveniently retrieve cardholder account information to provide at a plurality of payment fields and billing fields while "checking out" at an electronic merchant.

Upon installation and activation of the account information application, the cardholder provides information related to cardholder accounts to be stored. Such information is known as "cardholder account information." Cardholder account information may be stored at a local data repository on the mobile computing device. In at least some examples, the provided cardholder account information is stored using security methods including encryption, password protection, and challenge questions. Accordingly, information associated with the stored cardholder accounts may not be retrieved and/or decrypted without providing appropriate credentials such as passwords and responses to challenge questions. In at least one additional example, the cardholder account information may be stored on external data stores such as an external cardholder storage device (e.g., a secondary computer, networked storage, or direct attached mass storage device), or cloud storage. In all examples, the cardholder account information is stored on a "data store."

The cardholder may provide cardholder account information associated with a plurality of cardholder accounts. The cardholder may also provide cardholder account information for a variety of types of transaction cards such as a credit card, a debit card, a prepaid card, a charge card, a membership card, a promotional card, a frequent flyer card, an identification card, a prepaid card, a gift card, and/or any other device that may hold payment account information. In some examples, the cardholder may store cardholder account information for a plurality of transaction cards of each category of transaction card in the local data store. At any time, the cardholder may add, delete, and update cardholder account information by using the account information application.

As described herein, the account information application is used to provide cardholder account information to facilitate payment transactions in response to haptic inputs (e.g., gestures). Accordingly, the cardholder may also associate particular haptic inputs with the retrieval of cardholder account information. In one example, the cardholder associates certain haptic inputs (or combinations of haptic inputs) with the retrieval of cardholder account information as described below. The default for retrieval of cardholder account information may include a haptic tap and a horizontal, vertical, or diagonal haptic swipe. Alternately, a cardholder may train (i.e., instruct) the account information application to retrieve cardholder account information based upon different input. Further, the cardholder may train the account information application to associate non-haptic input with the retrieval of cardholder account information. Non-haptic input may include, for example, strings of text or other characters inputted at a virtual or physical keyboard, audio input received at a microphone, or any other suitable non-haptic input.

Additionally, the cardholder may train the account information application to retrieve particular cardholder account information for a particular cardholder account using a particular input. Accordingly, a cardholder may provide a first transaction card gesture to request cardholder account information for a first transaction card and alternately provide a second haptic gesture (specific to a second transaction card) to request cardholder account information for a second transaction card.

In the example embodiment, the account information application is installed at the operating system as an application. In an additional example, the account information application is installed as a plug-in to a web browser on the mobile computing device. In a further example, the account information application is installed as a plug-in to a particular application or applications on the mobile computing device.

After providing cardholder account information to the account information application, the cardholder may use the account information application as described herein. The cardholder identifies products for purchase and navigates to a checkout module. At the checkout module, the mobile computing device receives a first haptic gesture associated with a financial transaction. The first haptic gesture may include any suitable haptic gesture including, for example and without limitation, haptic taps, haptic swoops, and haptic swipes. In some examples, the first haptic gesture includes at least one of a haptic tap, a horizontal haptic swipe, a vertical haptic swipe, and a diagonal haptic swipe. In the example embodiment, the first haptic gesture is a haptic tap followed by a rightward or leftward horizontal haptic swipe.

In at least some examples, the account information application initially determines that the mobile computing device is displaying content associated with the financial transaction and is resultantly configured to accept the first haptic gesture. In these examples, inadvertent gestures that are performed at screens that are not a checkout module will not result in prompting the cardholder for payment method selections. Accordingly, the first haptic gesture will only be received when the cardholder is viewing content in a mobile application that includes a checkout module. The account information application determines that the mobile computing device is displaying content associated with the financial transaction by first identifying a set of content displayed on the mobile application (e.g., a mobile web browser or a mobile application), identifying a set of input fields associated with the set of content, and determining that the set of input fields is associated with the financial transaction. In other words, the account information application scans for information related to a transaction including the checkout module, payment fields, and billing fields, as described above and herein. The account information application may scan by searching for key terms including, for example, "credit card number", "expiration date", "security code", and "address" along with fields to provide data associated with such key terms.

The account information application provides a plurality of payment method options to the mobile computing device that are displayed as an overlay on the checkout module. The plurality of payment method options represents choices of payment cards that a cardholder may use for the purchase. Accordingly, each payment method option is associated with a cardholder account and a payment card. Information for each payment method option has been provided to the account information application by the cardholder.

In one example, a particular cardholder may initially provide a first haptic gesture and be provided with a first payment method option of "Credit Card A", a second payment method option of "Debit Card B", and a third payment method option of "Pre-Paid Card C." The plurality of payment methods options are displayed as an overlay on the checkout module and allow a cardholder to select a particular cardholder account for use in payment for the purchase. The plurality of payment methods are determined based upon the stored cardholder account information and are retrieved from the local data repository. Further, the plurality of payment methods are retrieved based upon the first haptic gesture.

In examples where the cardholder has trained the account information application to associate a particular haptic gesture with a particular cardholder account, the cardholder may receive a particular payment method option based upon such training. For example, in the example above, the cardholder may provide a particular first haptic gesture and be provided with only the second payment method option of "Debit Card B" but not the first payment method option of "Credit Card A" or the third payment method option of "Pre-Paid Card C." In such examples, the account information application may automatically populate the plurality of payment fields and the plurality of billing fields with appropriate information associated with Debit Card B.

In some examples, the account information application additionally receives a payment method selection as a second haptic gesture. The payment method selection is selected from the plurality of payment method options. In other words, the account information application receives input from a cardholder at the mobile computing device selecting a particular payment method option as the payment method selection. The second haptic gesture may include any suitable haptic gesture including haptic taps, haptic swipes, haptic swoops, and combinations thereof. In the example embodiment, the second haptic gesture represents tapping on a particular payment method option that is designated as the payment method selection.

The account information application identifies the plurality of payment fields and the plurality of billing fields associated with the financial transaction or payment transaction. The account information application identifies any payment fields and any billing fields that specifically associate to particular cardholder account information associated with the payment method selection. For example, if a cardholder indicates that "Credit Card A" is the payment method selection and "Credit Card A" has an account number of "1234567890" and an expiration of "Dec. 31, 2025", the account information application will identify payment fields associated with a credit card number and expiration date. The account information application categorizes each payment field and each billing field to a particular category. For example, the account information application categorizes a first payment field as an account number field and a second payment field as an expiration date field. The account information application makes such categorizations by using processing methods including pattern recognition, string matching, and language processing algorithms. In one example, the account information application identifies fields associated with terms including, for example, "credit card number", "expiration date", "security code", and "address".

When the account information application identifies and categorizes payment fields and billing fields, it automatically populates those payment fields and billing fields with corresponding information. If the account information application cannot identify and categorize at least some payment fields and billing fields, the account information application prompts the mobile computing device for a value for the uncategorized fields with a selection prompt. The selection prompt is presented as an overlay on top of the uncategorized fields of the checkout module. The account information application provides a plurality of field category options that the cardholder may select to identify appropriate categories for each uncategorized field. The account information application receives a plurality of field category selections and populates each uncategorized payment field and billing field based upon the selection. The plurality of field category selections may be received as third haptic gestures.

Accordingly, in the described examples, the account information application provides a plurality of cardholder account information for the financial transaction based at least in part on the payment method selection. As described, the cardholder account information may be provided automatically (i.e., when all payment fields and billing fields are successfully identified and categorized) or with the use of third haptic gestures to categorize each uncategorized field. The cardholder account information is provided after retrieval from a data store such as a local data repository, a secondary computer, networked storage, or direct attached mass storage device.

Further, in at least some examples, the account information application may require a security input before populating the cardholder account information into payment fields and billing fields. In such examples, the account information application may be associated with a password, a security haptic gesture, and any other suitable input. Such security input allows for a secondary layer of protection of cardholder account information. Security input may be associated with the account information application generally, or with particular cardholder accounts.

A technical effect of the systems and methods described herein include at least one of (a) a secure method of efficiently providing cardholder account information for mobile commerce purchases; (b) reducing the rate of abandoned "shopping carts" of cardholders engaged in mobile commerce by improving the ease of use of mobile commerce purchases; and (c) reducing the time required for a cardholder to make a mobile commerce purchase.

More specifically, the technical effects can be achieved by performing at least one of the following steps: (a) receiving, at the mobile computing device, a first haptic gesture associated with a financial transaction; (b) providing a plurality of payment method options retrieved from a data repository based upon receiving the first haptic gesture; (c) receiving, at the mobile computing device, a second haptic gesture comprising a payment method selection selected from the plurality of payment method options; (d) providing a plurality of cardholder account information for the financial transaction, the plurality of cardholder account information provided based at least in part on the payment method selection; (e) receiving at least one of a haptic tap, a horizontal haptic swipe, a vertical haptic swipe, and a diagonal haptic swipe; (f) determining that the mobile computing device is displaying content associated with the financial transaction; (g) providing a plurality of payment method options that may be associated with the financial transaction, each payment method option associated with a particular payment card; (h) storing the plurality of cardholder account information on at least one of a local data repository and cloud-based storage; (i) identifying a plurality of fields associated with the financial transaction; (j) automatically inputting the plurality of cardholder account information into at least one of the plurality of fields based at least in part on the second haptic gesture; (k) determining that the first haptic gesture is a transaction card specific gesture associated with a particular payment method option; (l) providing the plurality of cardholder account information for the financial transaction based on the transaction card specific gesture, without first providing the plurality of payment method options and receiving the payment method selection; (m) identifying a set of content displayed within at least one of a mobile web browser and a mobile application, identifying a set of input fields associated with the set of content, and determining that the set of input fields is associated with the financial transaction; (n) receiving the plurality of cardholder account information and storing the plurality of cardholder account information on at least one of a local data repository and cloud-based storage, wherein the plurality of cardholder account information is stored using at least one security method; (o) executing an account information application such that the first haptic gesture and the second haptic gesture may be detected by an operating system associated with the mobile computing device; and (p) executing an account information application such that the operating system detects the first haptic gesture and the second haptic gesture in any application provided by the mobile computing device.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the determination and analysis of characteristics of devices used in payment transactions.

FIG. 1 is a schematic diagram illustrating an example multi-party transaction card industry system 20 for enabling ordinary payment-by-card transactions, including payment-by-card transactions initiated by cardholders 22 using mobile computing devices 23 in communication with an online merchant 25, in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders 22.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. In the example embodiment, cardholder 22 uses a cardholder computing device 23 to initiate transactions with merchant 24. As described herein, cardholder computing device 23 is any suitable cardholder computing device that may be used to make financial transactions such as the electronic commerce purchases described herein.

By using cardholder computing device 23, cardholder 22 may purchase goods and services ("products") at a variety of online stores, applications, and other internet commerce presences. Cardholder 22 may make such purchases using virtual forms of the transaction card and, more specifically, by providing data related to the transaction card (e.g., the transaction card number, expiration date, associated postal code, and security code) to initiate transactions at such online stores, applications, and other internet commerce presences. In the example embodiment, cardholder 22 interacts with an online presence associated with merchant 24. This online presence is referred to as online merchant 25. Cardholder 22 interacts with online merchant 25 using cardholder computing device 23. In one example, cardholder 22 navigates to an electronic commerce site representative of online merchant 25. In another example, cardholder 22 uses an application provided by merchant 24 or a party associated with merchant 24 to purchase products of merchant 24 at online merchant 25. In other examples, online merchant 25 may similarly allow cardholder 22 to use cardholder computing device 23 to return products, dispute charges associated with products, and make any other financial transaction with merchant 24.

To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. In the example embodiment, online merchant 25 receives cardholder's 22 account information as provided by cardholder 22 using cardholder computing device 23. More specifically, online merchant 25 receives account information for cardholder 22 using gestures to retrieve such account information from a data store, as described herein. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24, via, in the example embodiment, online merchant 25.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 701 (shown in FIG. 7).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, cardholder computing device 23 is used to facilitate transactions as shown in FIG. 1. More specifically, an account information application stored on cardholder computing device 23 receives a plurality of input (e.g., haptic gestures) and provides a plurality of cardholder account information to online merchant 25, thus facilitating the transaction. Although the systems described herein are not intended to be limited to facilitate such applications, the systems are described as such for exemplary purposes.

Figure 2:
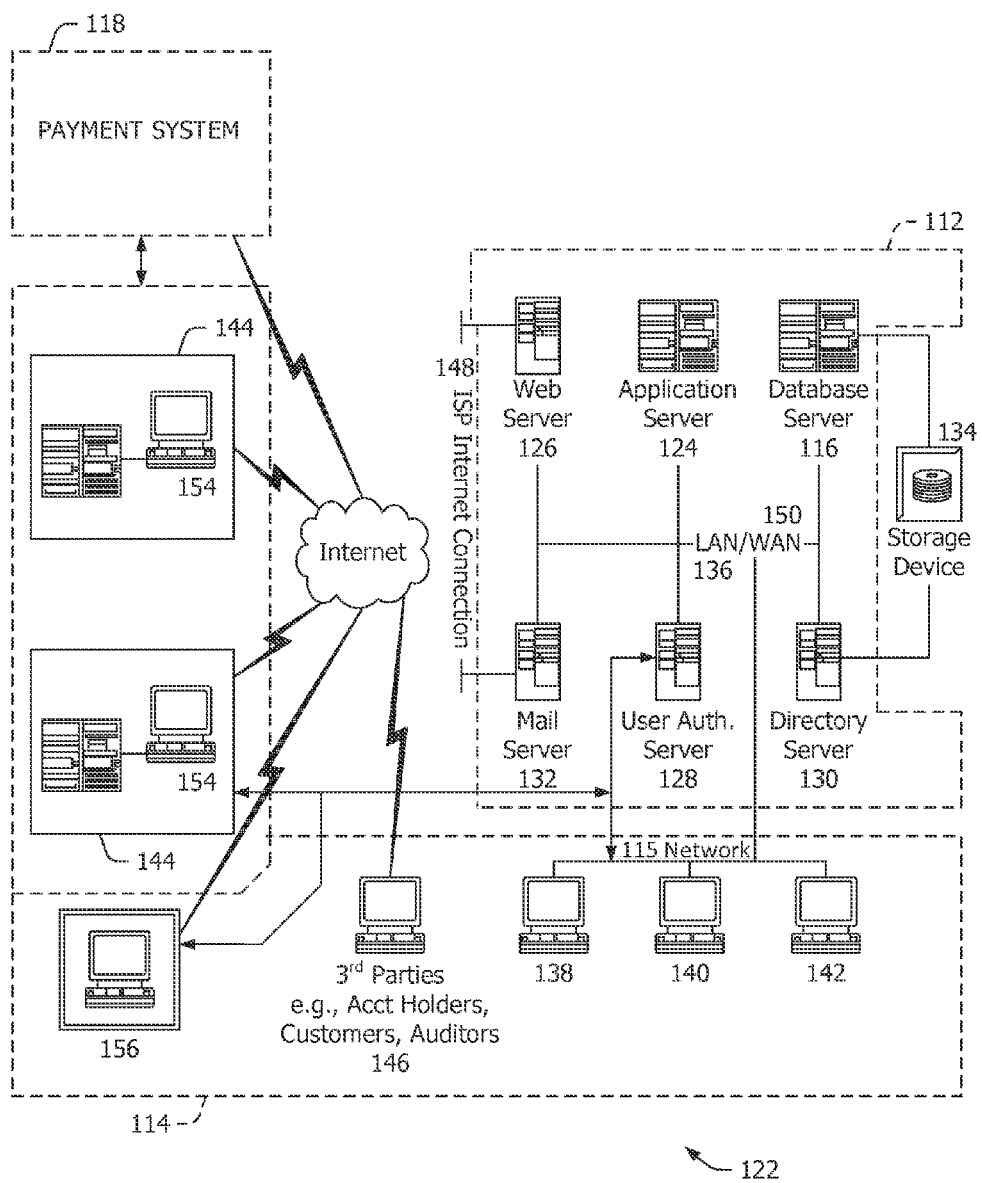

FIG. 2 is an expanded block diagram of an example embodiment of a computer server system architecture 122 used in payment transactions including other computer devices in accordance with one embodiment of the present disclosure. System 122 includes server computer system 112, client systems 114, and payment systems 118. Server computer system 112 further includes database server 116, a transaction server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server computer system 112 is configured to be operated by various individuals including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150. Server computer system 112 is also configured to be communicatively coupled to payment systems 118. Payment systems 118 include computer systems associated with merchant bank 26, interchange network 28, issuer bank 30 (all shown in FIG. 1), and interchange network 28. Additionally, payments systems 118 may include computer systems associated with acquirer banks and processing banks. Accordingly, payment systems 118 are configured to communicate with server computer system 112 and provide transaction data as discussed below.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server computer system 112.

Also, in the example embodiment, web server 126, application server 124, database server 116, and/or directory server 130 may host web applications, and may run on multiple server systems 112. The term "suite of applications," as used herein, refers generally to these various web applications running on server systems 112.

Furthermore, user authentication server 128 is configured, in the example embodiment, to provide user authentication services for the suite of applications hosted by web server 126, application server 124, database server 116, and/or directory server 130. User authentication server 128 may communicate with remotely located client systems, including a client system 156. User authentication server 128 may be configured to communicate with other client systems 138, 140, and 142 as well.

Figure 3:
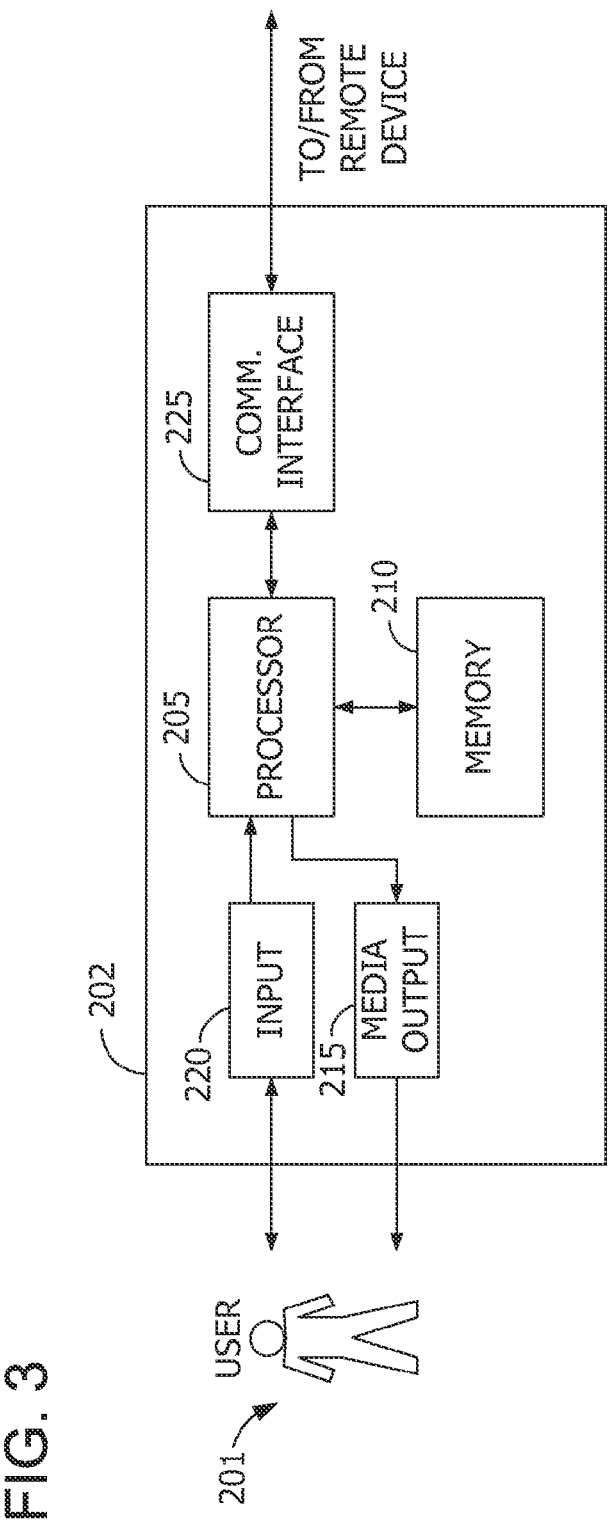

FIG. 3 illustrates an example configuration of a mobile computing device 202, such as cardholder computing device 23 (shown in FIG. 1) operated by a user 201, such as cardholder 22 (shown in FIG. 1). Mobile computing device 202 may include, but is not limited to, cardholder computing device 23, client systems 114, 138, 140, and 142, payment systems 118, workstation 154, and manager workstation 156. In the example embodiment, mobile computing device 202 is a smart phone such as cardholder computing device 23 used by cardholder 22. In alternative embodiments, mobile computing device 202 may include, without limitation, a smart phone, a personal digital assistant, a computer tablet, a hybrid phone/computer tablet ("phablet"), or other similar mobile device capable of communicating to the web. In the example embodiment, mobile computing device 202 also includes a microphone and speakers (not shown) for telephonic communication, recording, and audio playback. In the example embodiment, mobile computing device 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

Mobile computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, mobile computing device 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. Mobile computing device 202 may also include a communication interface 225, which is communicatively couplable to a remote device. Communication interface 225 may include, for example, a wired or wireless network adapter or a wireless data transceiver for use with a mobile phone network, Global System for Mobile communications (GSM), 3G, 4G or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website. A client application allows user 201 to interact with a server application. In the example embodiment, user 201 uses mobile computing device 202 to interact with online merchant 25 (shown in FIG. 1). More specifically, the client application may include a web browser, a shopping application, or any other merchant application configured to facilitate a transaction between user 201 and online merchant 25.

Further, in the embodiments described herein, memory area 210 receives and stores instructions for an account information application (not shown in FIG. 3) that is executed by processor 205. Account information application runs in the background at the operating system level and allows user 201 to provide inputs (e.g., haptic gestures) that result in the provision of cardholder account information to online merchant 25, as described herein.

Figure 4:
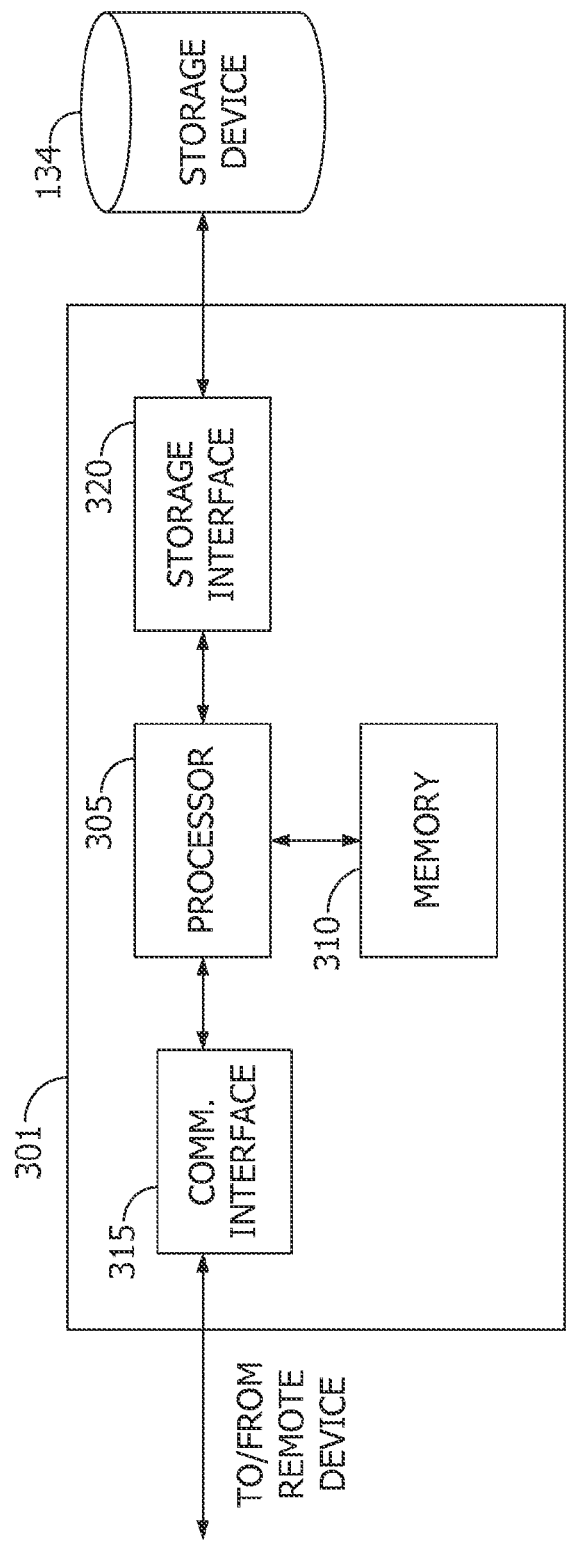

FIG. 4 illustrates an example configuration of a server system 301 such as online merchant (shown in FIG. 1). Server system 301 may also include, but is not limited to, database server 116, transaction server 124, web server 126, user authentication server 128, directory server 130, and mail server 132 (shown in FIG. 2). In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Accordingly, server system 301 is configured to interact with mobile computing device 202 (shown in FIG. 3). More specifically, the account information application described herein is used by mobile computing device 202 to provide cardholder account information to server system 301 and thereby facilitate a transaction.

Figure 5:
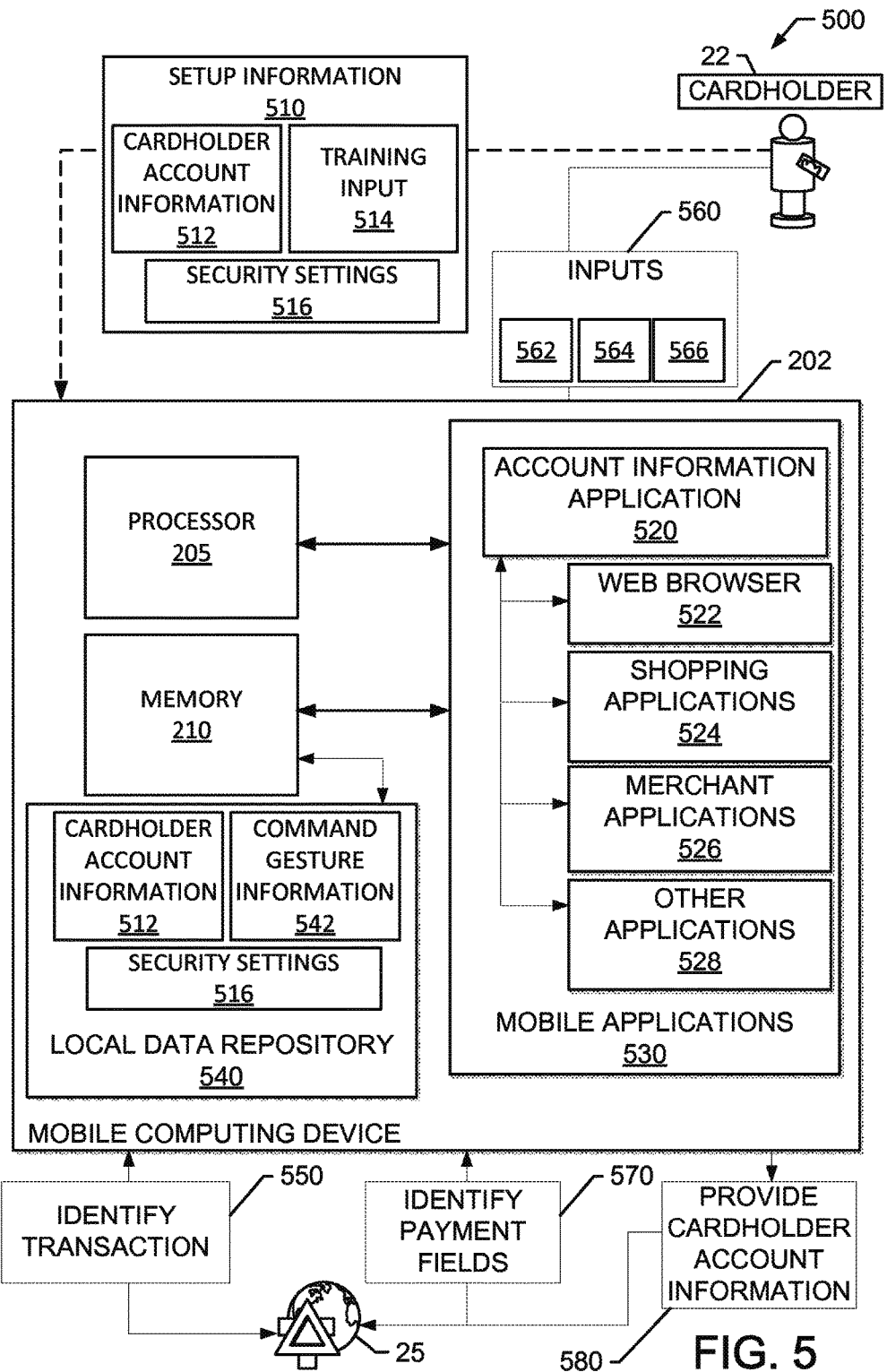

FIG. 5 is a simplified data flow diagram of an example mobile computing device 202 providing cardholder account information 512 in response to input 560 to facilitate a payment transaction. Cardholder account information application 520 ("account information application") is installed on mobile computing device 202. More specifically, account information application 520 is stored at memory 210 and executed by processor 205. In a similar fashion, mobile computing device 202 stores and executes a plurality of mobile applications 530 including, for example and without limitation, web browser 522, shopping applications 524, merchant applications 526, and other applications 528.

Account information application 520 is supported across a plurality of models and types of mobile computing devices 202 and a plurality of operating systems (not shown). For example, account information application 520 may be installed and executed with iOS™, Android™, Black-Berry™, Windows Phone™, and any other available operating system. (iOS is a trademark of Apple of Cupertino, Calif., BlackBerry is a trademark of BlackBerry Limited of Waterloo, Ontario, Windows Phone is a trademark of Microsoft of Redmond, Wash., and Android is a trademark of Google of Mountain View, Calif.). When executed, account information application 520 may interact with mobile applications 530 in the manner described herein.

In the example embodiment, account information application 520 runs as a "background process" even as mobile applications 530 are simultaneously used by cardholder 22. In some examples, mobile applications 530 are running in the "foreground" of mobile computing device 202. For example, although cardholder 22 may be using different mobile application 530 on mobile computing device 202 (such as web browser 522), cardholder 22 may provide inputs 560 (e.g., gestures) as described below and cause mobile computing device 202 to retrieve and/or provide cardholder account information 512. In other words, account information application 520 is stored and executed such that inputs 560 (such as haptic gestures 562, 564, and 566) are detected at the operating system layer and passed to mobile applications 530. Account information application 520 accordingly allows cardholder 22 to provide and update cardholder account information 512 when cardholder 22 is using mobile applications 530 provided by mobile computing device 202. Further, account information application 520 allows cardholder 22 to conveniently retrieve cardholder account information 512 to provide at a plurality of payment fields and billing fields (not shown in FIG. 5) while "checking out" at an electronic merchant.

Upon installation and activation of account information application 520, cardholder 22 provides setup information 510. Setup information 510 includes cardholder account information 512, representing information related to cardholder accounts to be stored. For example, cardholder account information may include information such as shown below (Table 1):

As described herein, cardholder 22 may accordingly use gestures to provide cardholder account information 512 for XYZ Credit Card or ABC Debit Card. Cardholder 22 may provide cardholder account information 512 associated with a plurality of cardholder accounts as described and shown in Table 1. Cardholder 22 may also provide cardholder account information 512 for a variety of types of transaction cards such as a credit card, a debit card, a prepaid card, a charge card, a membership card, a promotional card, a frequent flyer card, an identification card, a prepaid card, a gift card, and/or any other device that may hold payment account information. In some examples, cardholder 22 may store cardholder account information 512 for a plurality of transaction cards of each category of transaction card in local data repository 540. At any time, cardholder 22 may add, delete, and update cardholder account information 512 by using account information application 520. Setup information 510 also includes training input 514 and security settings 516, described below.

Cardholder account information 512 may be stored at a local data repository 540 stored in memory 210 of mobile computing device 202. In at least some examples, provided cardholder account information 512 is stored using security methods including encryption, password protection, and challenge questions. Such security methods are identified in setup information 510 as security settings 516. Accordingly, information associated with stored cardholder accounts information 512 may not be retrieved and/or decrypted without providing appropriate credentials such as passwords and responses to challenge questions. In at least one additional example, cardholder account information 512 may be stored on external data stores (not shown) such as an external cardholder storage device (e.g., a secondary computer, networked storage, or direct attached mass storage device), or cloud storage. External data stores may also mirror stored information to local data repository 540. In all examples, cardholder account information 512 is stored on a data repository.

As described herein, account information application 520 is used to provide cardholder account information 512 to facilitate payment transactions in response to inputs 560 (e.g., haptic gestures 562, 564, and 566). Accordingly, cardholder 22 may also associate particular haptic inputs such as training input 514 with retrieval of cardholder account information 512. In one example, cardholder 22 associates training input 514 with the retrieval of cardholder account information 512 as described below. The default for retrieval of cardholder account information 512 may include a haptic tap and a horizontal, vertical, or diagonal haptic swipe in any sequence or combination. However, cardholder 22 may train (i.e., instruct) account information application 520 with training input 514 to retrieve cardholder account information 512 based upon any distinct haptic input (e.g., two crossing diagonal haptic swipes) the cardholder 22 desires. Further, cardholder 22 may train account information application 520 to associate non-haptic input with the retrieval of cardholder account information 512. Non-haptic

TABLE 1

| Card Type | Card Number | Expiration Date | Security Code | Billing Address | City | State | Zip | Gesture |
|---|---|---|---|---|---|---|---|---|
| XYZ Credit Card | 1234567890 | Dec. 31, 2025 | 99999 | 123 A Street | Anytown | State A | 12345 | Gesture A |
| ABC Debit Card | 9876543210 | Jan. 1, 2035 | 11111 | 456 Z Avenue | Anycity | State B | 54321 | Gesture B | input may include, for example, strings of text or other characters inputted at a virtual or physical keyboard, audio input received at a microphone, or any other suitable non-haptic input. Such training may also be accomplished by providing training input 514.

Additionally, cardholder 22 may train account information application 520 to retrieve particular cardholder account information 512 for a particular cardholder account using a particular input 560. Accordingly, cardholder may provide first transaction card gesture 562 to request cardholder account information 512 for a first transaction card (not shown) and alternately provide a second haptic gesture 564 (specific to a second transaction card) to request cardholder account information 512 for a second transaction card (not shown).

In the example embodiment, account information application 520 is installed at the operating system as part of mobile applications 530. In an additional example, account information application 520 is installed as a plug-in to another mobile application 530 such as web browser 522. In a further example, account information application 520 is installed as a plug-in to any mobile application 530.

Figure 8:
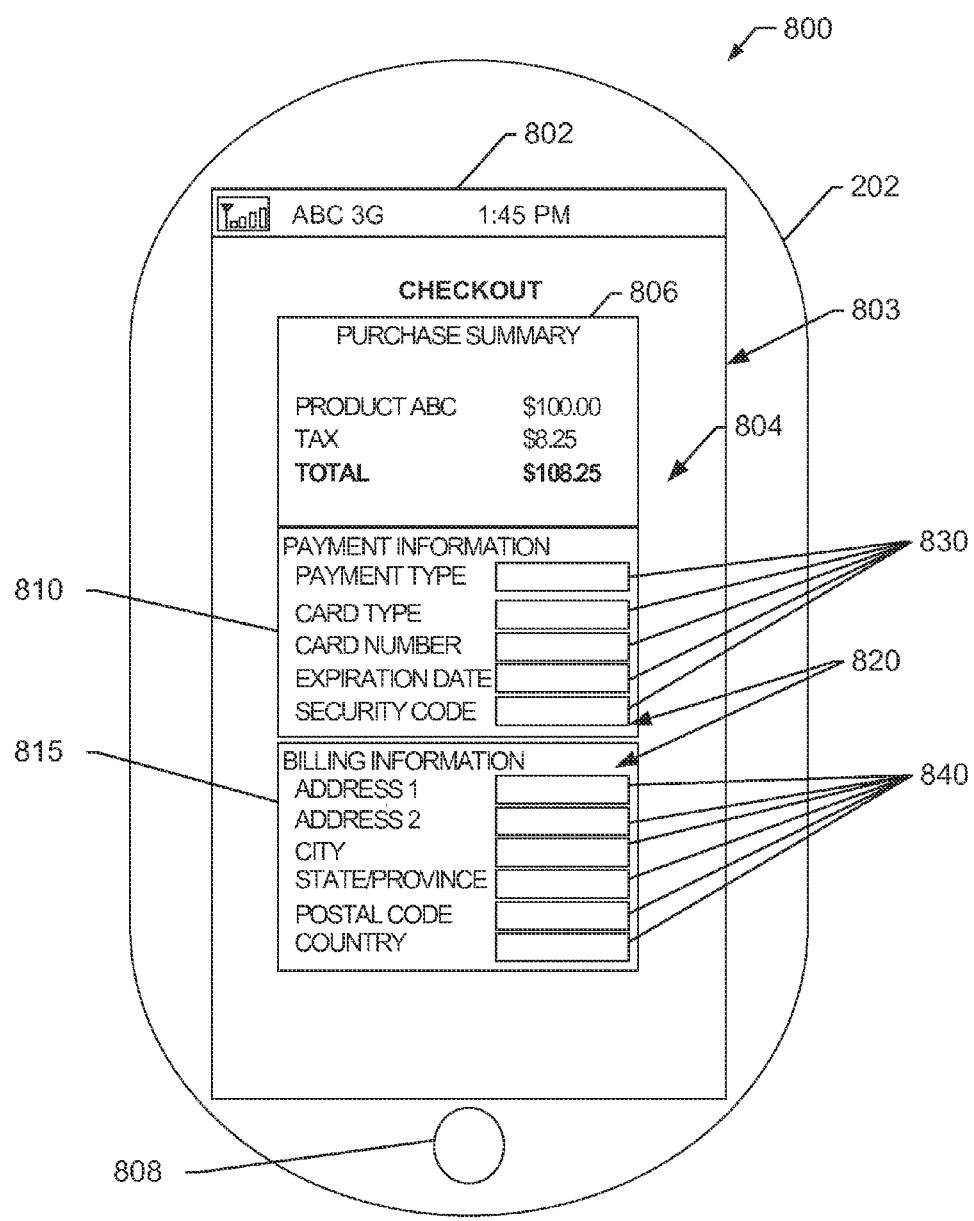

After providing setup information 510 to account information application 520, cardholder 22 may use account information application 520 as described herein. Referring to FIG. 8, cardholder 22 uses mobile computing device 202 for online commerce with an online merchant 25 (shown in FIG. 1). Cardholder 22 uses mobile display 802 to interact with a mobile application 803. Mobile computing device 202 also includes input components 808. Input components 808 include buttons, keyboards, touchscreen displays, and any other suitable inputs. In the example embodiment, mobile application 803 is a web browser such as web browser 522 (shown in FIG. 5). Alternately, mobile application 803 may be any mobile application 530 (shown in FIG. 5). Although account information application 520 is not displayed, it is running in the background of mobile computing device 202. Cardholder 22 identifies products for purchase and navigates to checkout module 804. As described above and herein, checkout module 804 includes a first set of purchase information 806. First set of purchase information 806 recites information associated with the products identified for purchase. In FIG. 8, first set of purchase information 806 includes a "Purchase Summary" listing the product purchased and the charges and taxes associated with the product.

Checkout module 804 also includes payment component 810. Payment component 810 is configured to receive information from mobile computing device 202 indicating how the identified products will be paid for. Payment component 810 includes a plurality of payment fields 830. Checkout module 804 also includes billing component 815. Billing component 815 includes billing fields 840 related to billing of the purchase. More specifically, in the example embodiment, billing fields 840 include at least one address field, a city or municipality field, a state or province field, a postal code field, and a country field.

Although payment fields 830 and billing fields 840 are identified and discussed separately, they are processed together by account information application 520. Accordingly, payment fields 830 and billing fields 840 may also be discussed interchangeably and may alternately be referred to as "transaction fields."

Figure 9:
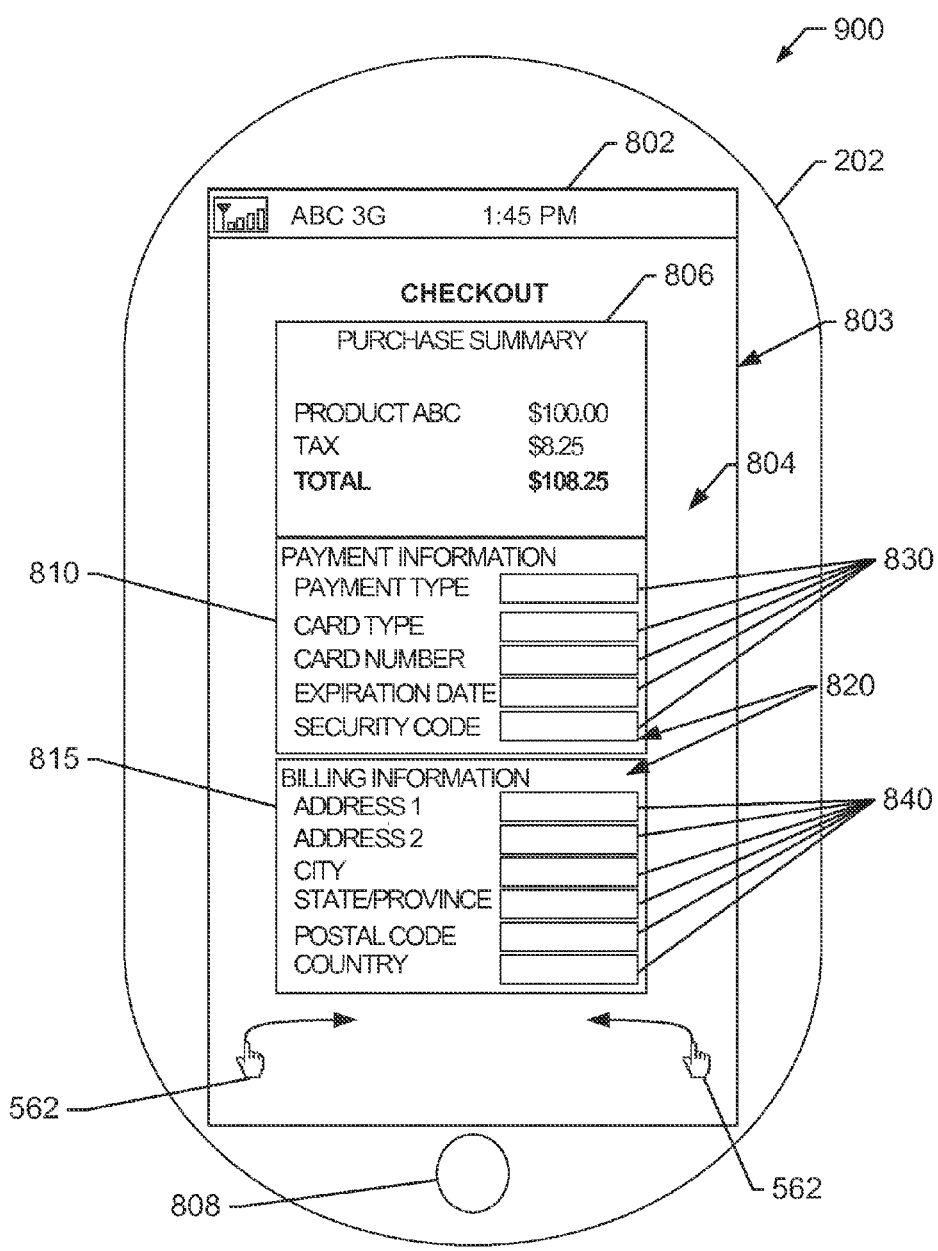

Referring to FIG. 9, mobile computing device 202 receives a first haptic gesture 562 at checkout module 804. As described herein, first haptic gesture 562 causes account information application 520 (shown in FIG. 5) to provide a plurality of payment options (not shown in FIG. 9) to mobile computing device 202 and to cardholder 22 (shown in FIG. 5).

First haptic gesture 562 may include any suitable haptic gesture including, for example and without limitation, haptic taps, haptic swoops, and haptic swipes. In some examples, first haptic gesture 562 includes at least one of a haptic tap, a horizontal haptic swipe, a vertical haptic swipe, a diagonal haptic swipe, a circular swipe, a rectangular swipe, a triangular swipe, or combinations or sequences thereof. In the example embodiment, first haptic gesture 562 is a haptic tap followed by a rightward or leftward horizontal haptic swipe. As described below, first haptic gesture 562 is compared to command gesture information 542 an associated command gesture is identified. In other words, at least one command gesture associated with first haptic gesture 562 is identified from command gesture information 542. Further, at least some cardholder account information 512 associated with command gesture information 542 is identified and used to provide a plurality of payment method options 1010 (shown in FIG. 10).

In at least some examples, account information application 520 initially determines that mobile computing device 202 is displaying content associated with the financial transaction (such as checkout module 804) and is resultantly configured to accept first haptic gesture 562. In these examples, inadvertent gestures that are performed at screens that are not checkout module 804 will not result in presenting payment method options and prompting cardholder 22 for payment method selections. Accordingly, first haptic gesture 562 will only be received when cardholder 22 is viewing content that includes checkout module 804 or other content that relates to a payment transaction and may receive cardholder account information 512. Referring to FIG. 5, account information application 520 identifies payment transaction 550 associated with online merchant 25. Returning to FIG. 9, account information application 520 determines that mobile computing device 202 is displaying content associated with the financial transaction by first identifying a set of content displayed on mobile application 530, identifying a set of input fields associated with the set of content (such as payment fields 830 and billing fields 840), and determining that the set of input fields is associated with a financial transaction. In other words, account information application 520 scans for information related to a payment transaction including text for checkout module 804, payment fields 830 and billing fields 840, as described above and herein. Account information application 520 may scan by searching for key terms and tags including, for example, "credit card number", "expiration date", "security code", and "address" along payment fields 830 and billing fields 840 to provide data associated with such key terms.

Figure 10:
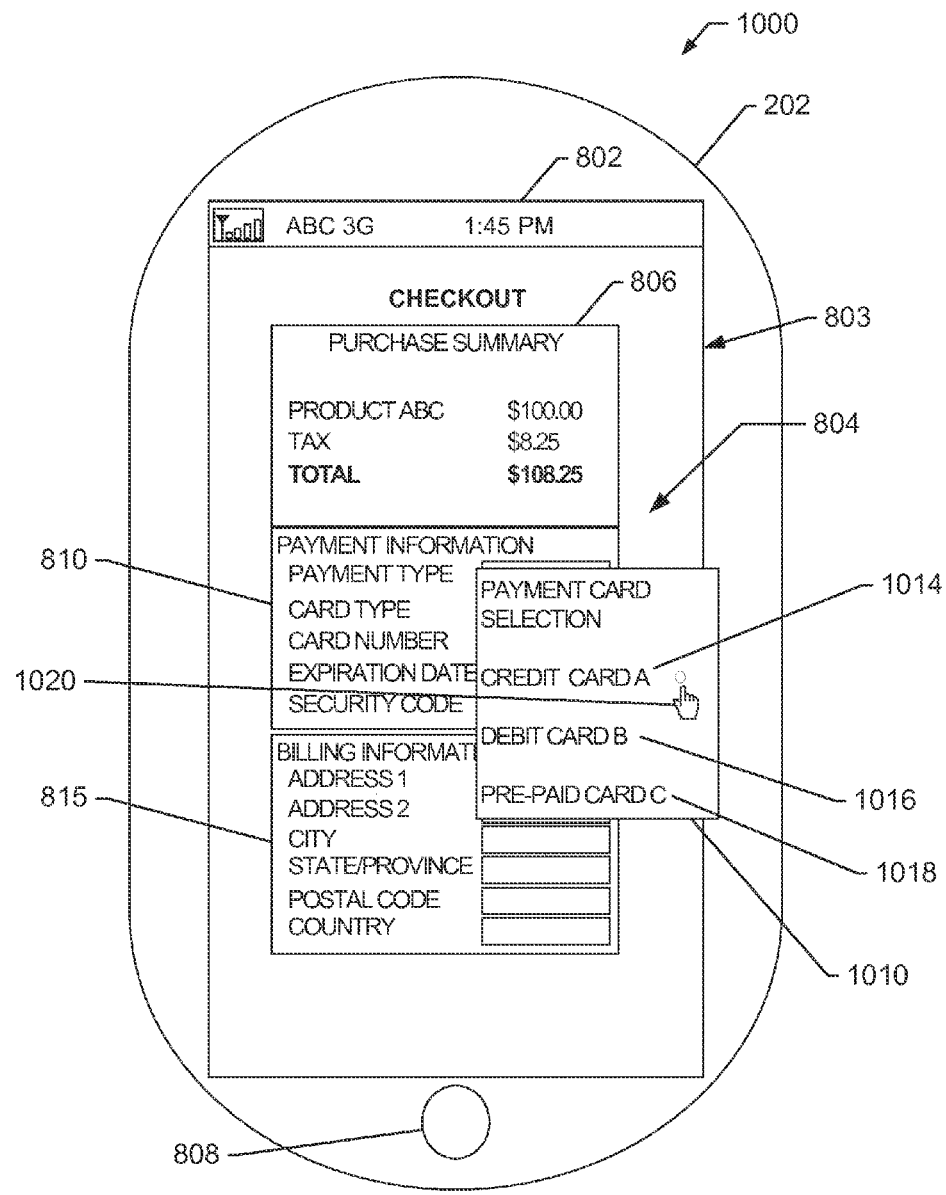

Referring to FIG. 10, account information application 520 provides a plurality of payment method options 1010 to mobile computing device 202 that are displayed as an overlay on checkout module 804. Plurality of payment method options 1010 represents choices of payment cards that cardholder 22 may use for the purchase. For example, in FIG. 10, cardholder 22 is presented with first payment method option 1014, second payment method option 1016, and third payment method option 1018. Accordingly, each payment method option 1010 is associated with a cardholder account and a payment card. Information for each payment method option 1010 has been provided to account information application 520 by cardholder 22 in setup information 510 (shown in FIG. 5). In other words, plurality of payment method options 1010 are determined based upon stored cardholder account information 512 and are retrieved from local data repository 540. As described herein, plurality of payment method options 1010 are retrieved based upon first haptic gesture 562.

In examples where cardholder 22 has trained account information application 520 with training input 514 (shown in FIG. 5) to associate a particular input 560 (such as a haptic gesture) with a particular cardholder account, cardholder 22 may receive a particular payment method option 1014, 1016, or 1018 based upon such training. For example, in contrast to FIG. 10, cardholder 22 may provide a particular first haptic gesture 562 and be provided with only second payment method option 1016 of "Debit Card B" but not first payment method option 1014 of "Credit Card A" and third payment method option 1018 of "Pre-Paid Card C." In such examples, the account information application 520 may automatically populate plurality of payment fields 830 and billing fields 840 with appropriate information associated with second payment method option 1016 because no other options may be made. Accordingly, using training input 514, cardholder 22 may provide specific inputs 560 and interact with checkout module 804 more quickly. Such training input 514 and default gestures are stored at local data repository 540. In other words, local data repository 540 includes information that may allow input 560 to be associated with cardholder account information 512 and result in providing 580 cardholder account information.

In all examples account information application 520, compares a received input 560 to command gesture information 542 stored at local data repository 540. For example, a particular input 562 may include a leftward haptic swipe followed by a downward haptic swipe. Account information application 520 receives input 562 (or any other sequence or combination of inputs 560) and identifies and analyzes component gestures to identify input gesture information. For example, account information application 520 may determine that a leftward haptic swipe and a downward haptic swipe were received. In some examples, the length of time for each gesture may be determined. In additional examples, the delay between gestures may be determined. All such identified and analyzed input gesture information may be compared to command gesture information 542 stored at local data repository 540. Command gesture information 542 represents any gestures that have been previously provided by cardholder 22 or by the system as default settings. Command gesture information 542 includes gestures configured to be detected by account information application 520 and result in providing 580 cardholder account information. Further, command gesture information 542 is associated with cardholder account information 512 in the manner described herein. More specifically, particular gestures of command gesture information 542 (such as default gestures or gestures based on training input 514) are associated with particular cardholder account information 512.

In one example, command gesture information 542 initially includes one default gesture associated with a primary cardholder account with associated information stored in cardholder account information 512. The default gesture is a leftward swipe. Cardholder 22 trains account information application 520 using training input 514 and further causes command gesture information 542 to add a first trained gesture. Cardholder 22 further associates the first trained gesture with a secondary cardholder account with associated information stored in cardholder account information 512. Accordingly, local data repository 540 associates cardholder account information 512 with command gesture information 542.

In one example, receiving input 562 as a leftward haptic swipe and a downward haptic swipe results in a retrieval of any command gesture information 542 (i.e., default gestures or gestures based on training input 514) from local data repository 540 Command gesture information 542 is compared to the received input 562. Any command gesture information 542 associated with a leftward haptic swipe and a downward haptic swipe is identified through such a comparison. Such a comparison may involve a direct comparison of input 562 to command gestures information 542 or a "fuzzy" comparison allowing for slight variations between input 562 and command gesture information 542. For example, account information application 520 may detect a slight deviation from command gesture information 542 and otherwise ignore such a deviation because it falls within acceptable pre-determined thresholds for gesture variance.

Upon identifying such command gesture information 542, account information application 520 retrieves cardholder account information 512 associated with command gesture information 542. Accordingly, account information application 520 may be use retrieved cardholder account information 512 and provide 580 cardholder account information to online merchant 25, as described herein.

In at least some examples, account information application 520 additionally receives a payment method selection 1020 as a second haptic gesture 564 (shown in FIG. 5). Payment method selection 1020 is selected from plurality of payment method options 1010. In other words, account information application 520 receives input (such as haptic input) from cardholder 22 at mobile computing device 202 selecting a particular payment method option 1010 as the payment method selection 1020. In FIG. 10, cardholder 22 selects first payment method option 1014 (for "Credit Card A") but in alternative examples, any payment method option 1010 may be selected. Second haptic gesture 564 may include any suitable haptic gesture including haptic taps, haptic swipes, haptic swoops, and combinations thereof. In the example embodiment, second haptic gesture 564 represents tapping on particular payment method option 1014 that is accordingly designated as payment method selection 1020.

Returning to FIG. 5, account information application 520 identifies the plurality of payment fields and billing fields 570 associated with the financial transaction or payment transaction. Account information application 520 identifies any payment fields and billing fields that specifically associate to particular cardholder account information 512 associated with payment method selection 1020. For example, if a cardholder indicates that "Credit Card A" is payment method selection 1020 and "Credit Card A" has an account number of "1234567890" and an expiration of "Dec. 31, 2025", account information application 520 will identify payment fields associated with a credit card number and expiration date.

Returning to FIG. 10, account information application 520 identifies "CARD NUMBER" and "CARD EXPIRATION" in the example given. Account information application 520 further categorizes each payment field 830 and each billing field 840 to a particular category. For example, account information application 520 categorizes a first payment field 830 as an account number field and a second payment field 830 as an expiration date field. Account information application 520 makes such categorizations by using processing methods including pattern recognition, string matching, and language processing algorithms. In one example, account information application 520 identifies fields associated with terms including, for example, "credit card number", "expiration date", "security code", and "address".

Figure 11:
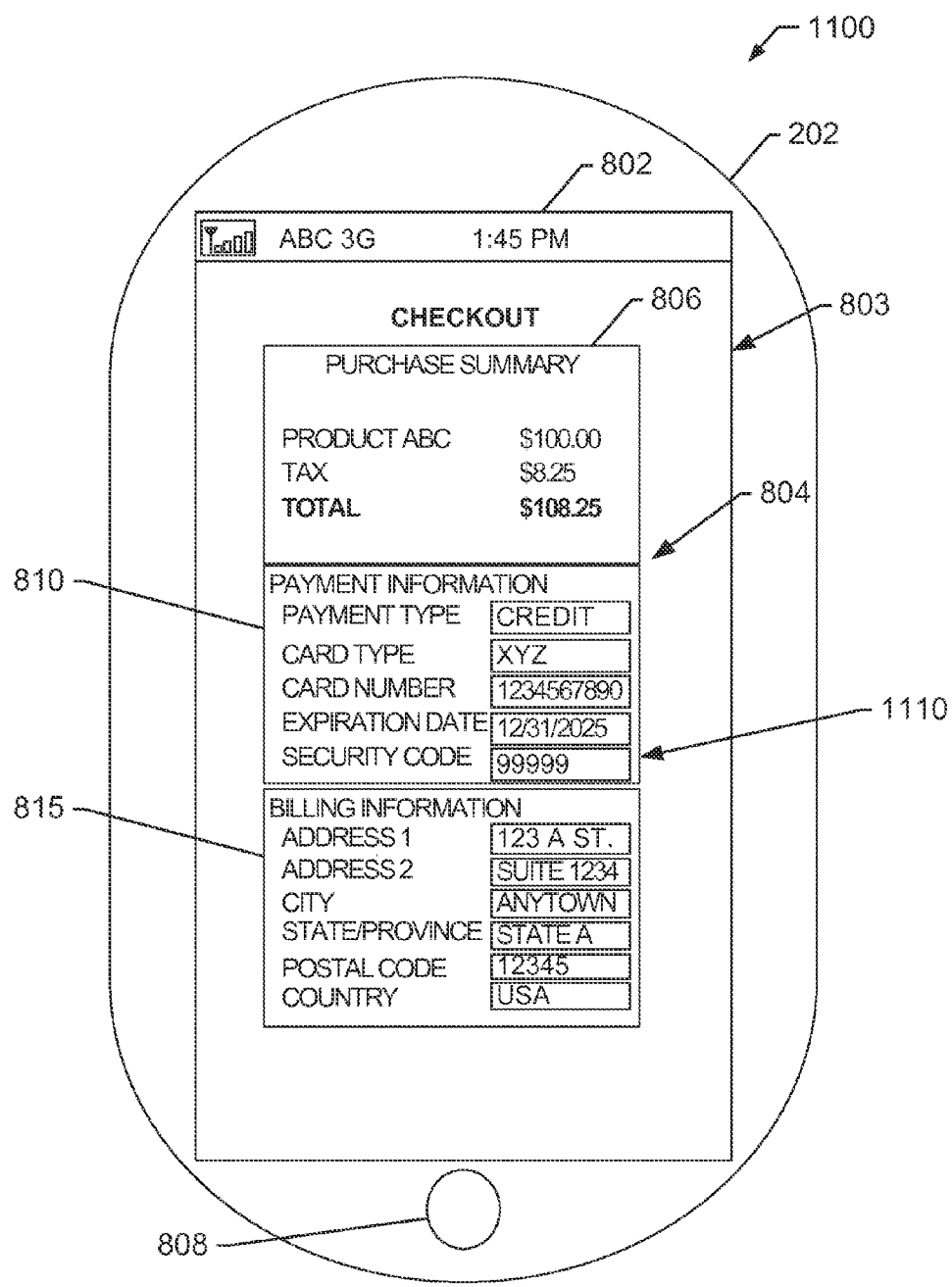

Returning to FIG. 5, account information application 520 automatically populates those payment fields 830 and billing fields 840 with corresponding information from cardholder account information 512 based upon identification of payment fields and billing fields 570. More specifically, account information application 520 provides cardholder account information 580 to online merchant 25. Referring to FIG. 11, such information is provided as data 1110 in payment fields 830 and billing fields 840.

If account information application 520 cannot identify and categorize at least some payment fields 830 or billing fields 840, account information application 520 prompts mobile computing device 202 for a value for the uncategorized fields with a selection prompt. The selection prompt is presented as an overlay on top of the uncategorized fields of checkout module 804. Account information application 520 provides a plurality of field category options that cardholder 22 may select to identify appropriate categories for each uncategorized field.

Figure 12:
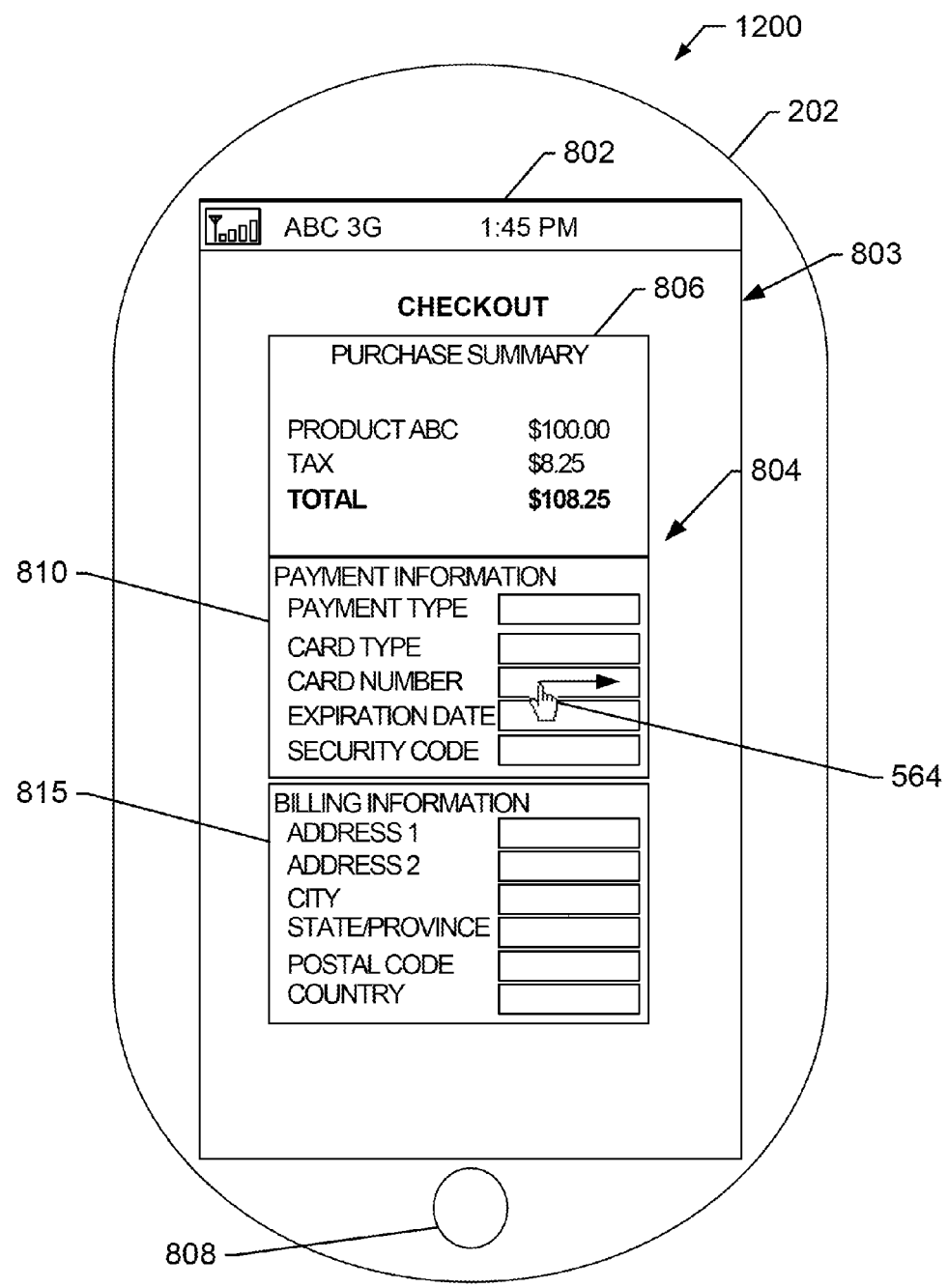
Figure 13:
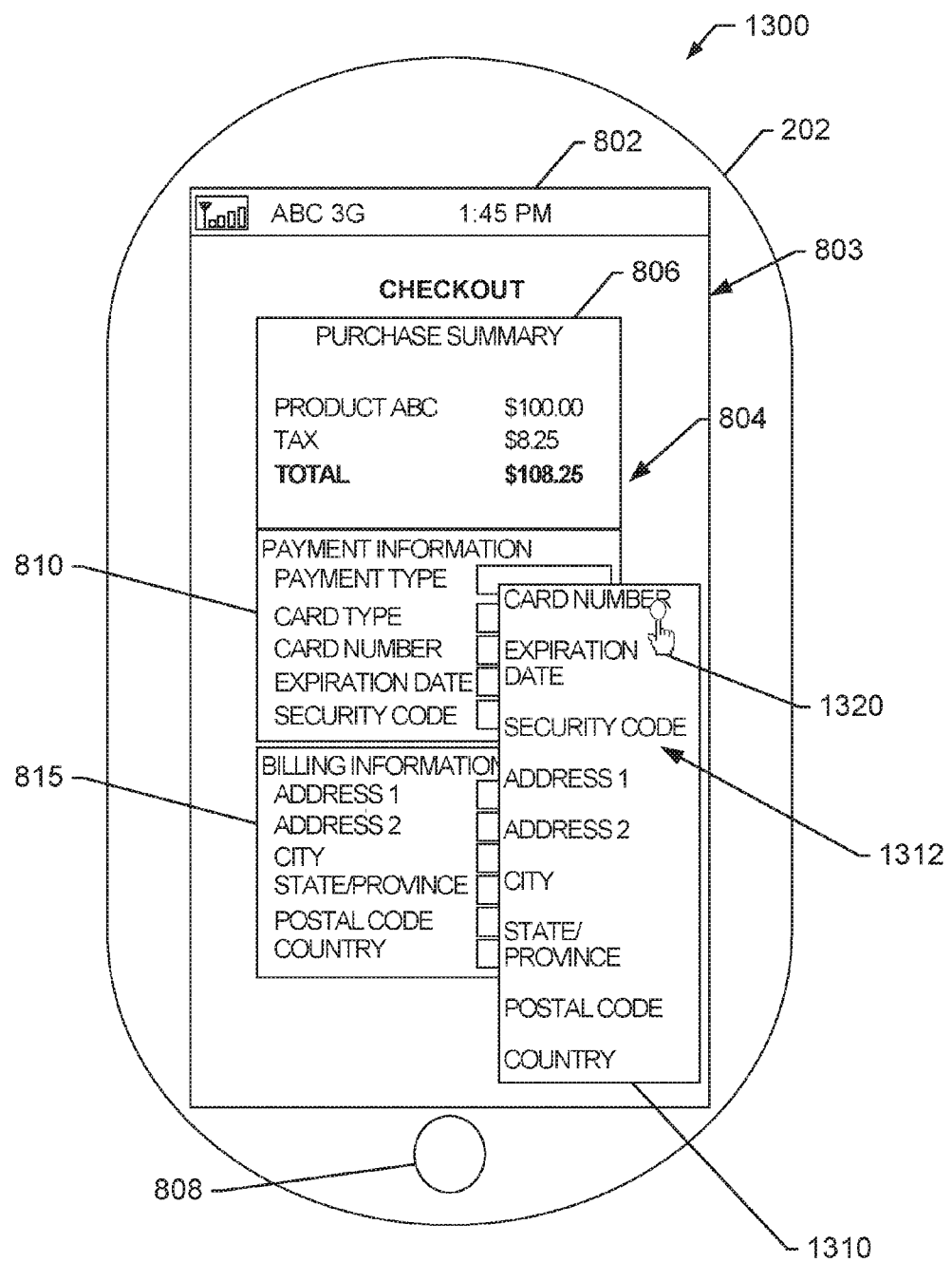
Figure 14:
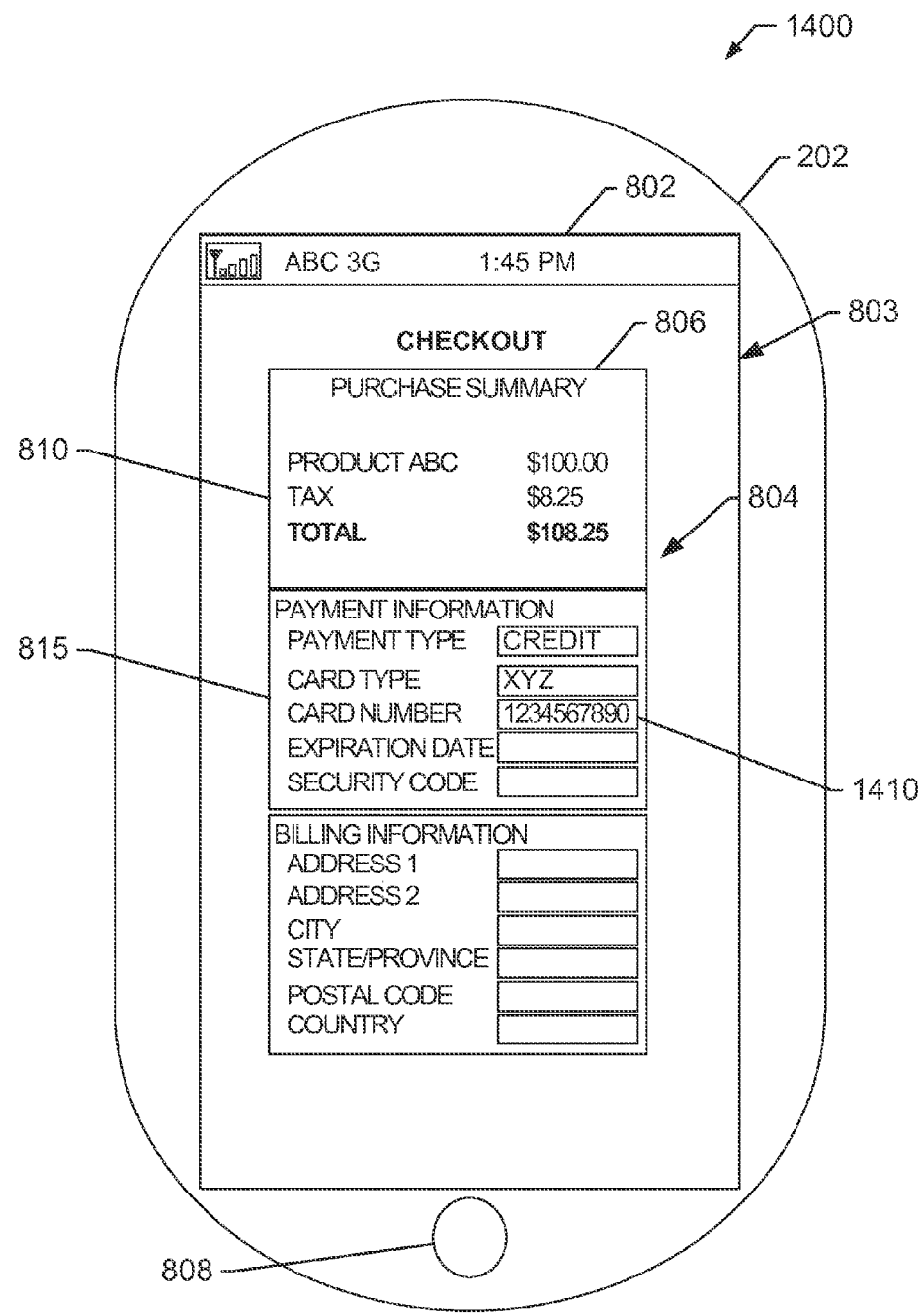

In at least one example, account information application 520 cannot identify and categorize payment fields 830 or billing fields 840. In such examples, as in illustration 1200 of FIG. 12, cardholder 22 provides second haptic gesture 564 to select a particular payment field 830 or billing field 840 requiring input. In FIG. 13, account information application 520 provides a selection overlay 1310 including a plurality of field category options 1312 that cardholder 22 may select from to identify appropriate categories for each uncategorized field. Account information application 520 receives a plurality of field category selections 1320 and populates each uncategorized payment field 830 and billing field 840 based upon the selection. Plurality of field category selections 1320 may be received as third haptic gestures 566. For example, in FIG. 14, payment field 830 for "CARD NUMBER" is populated with data 1410 based on third haptic gesture 566. As above, second haptic gesture 564 and third haptic gesture 566 may be compared to command gesture information 542 to identify associated cardholder account information 512. Accordingly, when any gesture 560 including haptic gestures 562, 564, and 566 are received, such gestures are compared to command gesture information 542 in local data repository 540. Upon finding a corresponding command gesture in command gesture information 542 (using direct comparisons or fuzzy comparisons), at least a portion of cardholder account information 512 associated with the identified command gesture is retrieved and used to provide at least one of a plurality of payment method options to a party such as, for example, cardholder 22 or a plurality of cardholder account information to a party such as, for example, online merchant 25.

Accordingly, in the described examples, account information application 520 provides a plurality of cardholder account information 512 for the financial transaction based at least in part on payment method selection 1020 (shown in FIG. 10). As described, cardholder account information 512 may be provided 580 (shown in FIG. 5) automatically (i.e., when all payment fields 830 and billing fields 840 are successfully identified and categorized) or with use of third haptic gestures 566 (shown in FIG. 5) to categorize each uncategorized field. Cardholder account information 512 is provided 580 after retrieval from a data store such as a local data repository 540 (shown in FIG. 5), a secondary computer, networked storage, or direct attached mass storage device.

Further, in at least some examples, account information application 520 may require a security input before providing cardholder account information 580 into payment fields 830 or billing fields 840. In such examples, account information application 520 may be associated with a password, a security haptic gesture, and any other suitable input. Such security input allows for a secondary layer of protection of cardholder account information. Security input may be associated with account information application 520 generally, or with particular cardholder accounts. Security input may be provided with setup information 510 (shown in FIG. 5).

Figure 6:
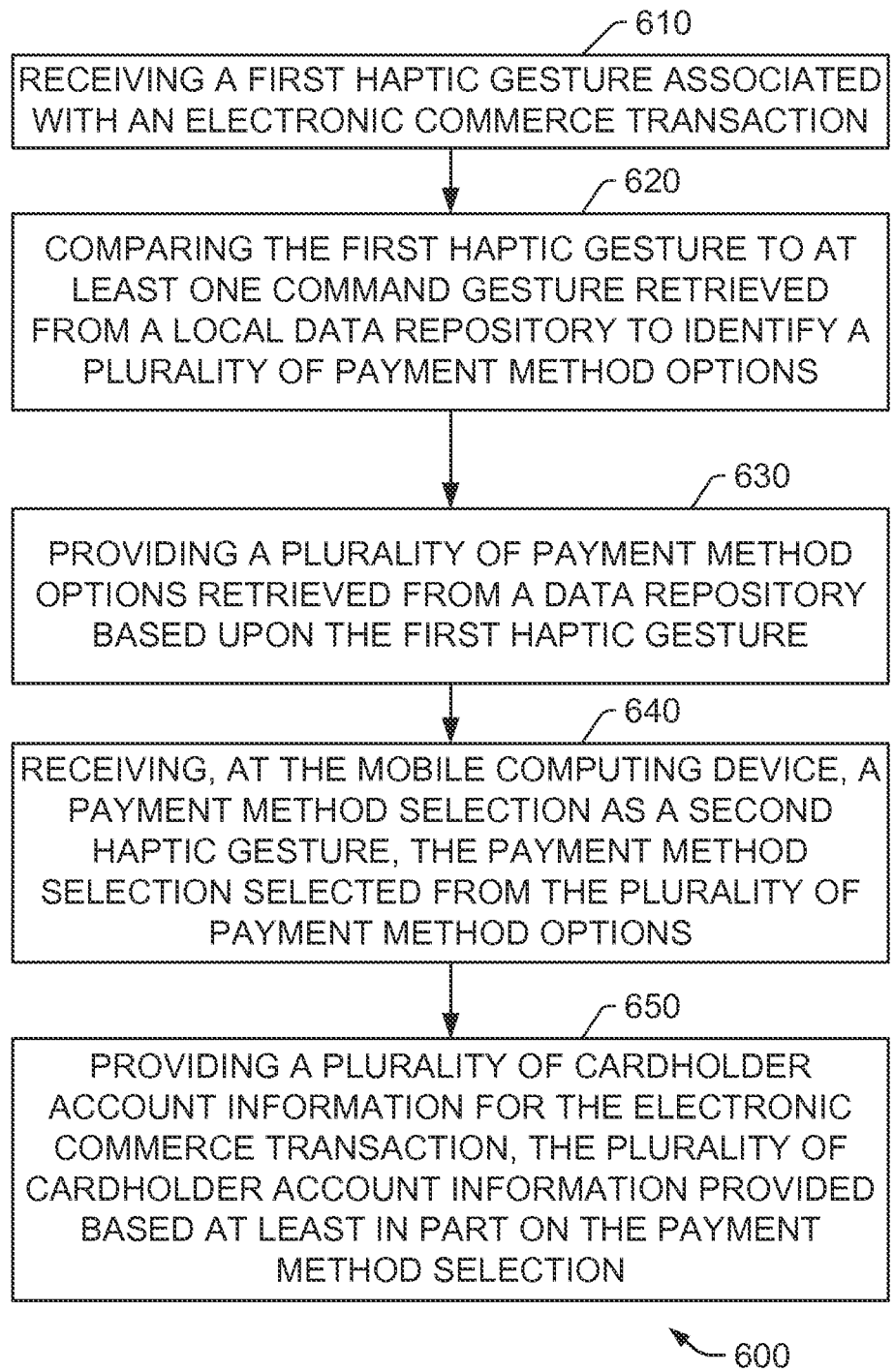

FIG. 6 is a simplified diagram of an example method 600 of providing cardholder account information 512 (shown in FIG. 5) in response to haptic gestures 562, 564, and 566 (shown in FIG. 5) at mobile computing device 202 (shown in FIG. 5) to facilitate a payment transaction. Method 600 is executed by mobile computing device 202 and includes receiving 610 a first haptic gesture associated with a financial transaction. Receiving 610 represents mobile computing device 202 receiving input 560 such as first haptic gesture 562 from cardholder 22 (all shown in FIG. 5).

Mobile computing device 202 is also configured to compare 620 the first haptic gesture to at least one command gesture retrieved from a local data repository to identify a plurality of payment method options. Comparing 620 represents comparing received input 560 to at least one command gesture of command gesture information 542 (shown in FIG. 5) stored at local data repository 540 (shown in FIG. 5) to identify a plurality of payment method options in cardholder account information 512 (shown in FIG. 5) associated with the at least one command gesture.

Mobile computing device 202 is also configured to provide 630 a plurality of payment method options retrieved from a data repository based upon the first haptic gesture. Providing 630 represents displaying or otherwise providing plurality of payment method options 1010 (shown in FIG. 10) received from local data repository 540 (shown in FIG. 5) on mobile computing device 202.

Mobile computing device 202 is additionally configured to receive 640 a second haptic gesture comprising a payment method selection selected from the plurality of payment method options. Receiving 640 represents receiving input 560 such as second haptic gesture 564 wherein input 560 further represents a payment method selection 1020 (shown in FIG. 10) selected from payment method options 1010.

Mobile computing device 202 is also configured to provide 650 a plurality of cardholder account information for the financial transaction, the plurality of cardholder account information provided based at least in part on the payment method selection. Providing 650 represents providing at least a portion of cardholder account information 512 (shown in FIG. 5) retrieved from local data repository 540 to online merchant 25 (shown in FIG. 1) based on payment method selection 1020.

Figure 7:
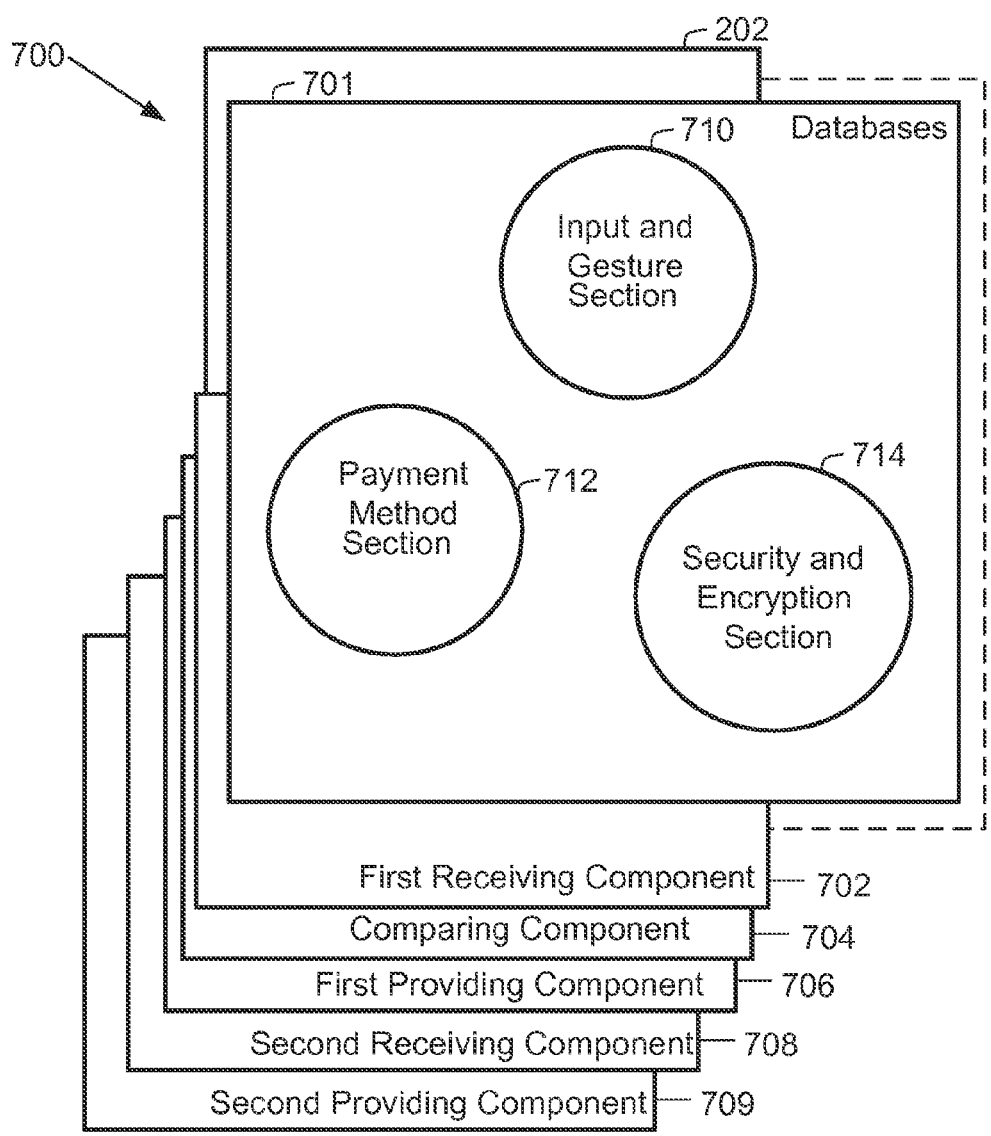

FIG. 7 is a diagram 700 of components of one or more example computing devices that may be used in the environment shown in FIG. 5. FIG. 7 further shows a configuration of databases including at least database 701. Database 701 is coupled to several separate components within mobile computing device 202, which perform specific tasks.

Mobile computing device 202 includes a first receiving component 702 for receiving a first haptic gesture associated with a financial transaction. Mobile computing device 202 also includes a comparing component 704 for comparing the first haptic gesture to at least one command gesture retrieved from a local data repository to identify a plurality of payment method options. Mobile computing device 202 also includes a first providing component 706 for providing a plurality of payment method options retrieved from a data repository based upon the first haptic gesture. Mobile computing device 202 additionally includes a second receiving component 708 for receiving a second haptic gesture comprising a payment method selection selected from the plurality of payment method options. Mobile computing device 202 further includes a second providing component 709 for providing a plurality of cardholder account information for the financial transaction, the plurality of cardholder account information provided based at least in part on the payment method selection.

In an exemplary embodiment, database 701 is divided into a plurality of sections, including but not limited to, an input and gesture section 710, a payment method section 712, and a security and encryption section 714. These sections within database 701 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for providing cardholder account information associated with at least one cardholder account to facilitate a payment transaction in response to gestures at a mobile computing device, the mobile computing device including an input device and a display device, the method comprising:
   receiving, by the input device, a first haptic gesture during a financial transaction;
   comparing the first haptic gesture to command gesture information stored in a data repository to identify and select a payment method associated with the first haptic gesture;
   displaying on the mobile computing device a plurality of uncategorized payment fields and uncategorized billing fields associated with the payment method;
   receiving, by the input device, a second haptic gesture to select an uncategorized payment field or an uncategorized billing field;
   comparing the second haptic gesture to command gesture information stored in the data repository;
   to display a plurality of field category options associated with the selected uncategorized payment field or uncategorized billing field;
   receiving, by the input device, a third haptic gesture to select a field category option associated with the selected uncategorized payment field or uncategorized billing field;
   comparing the third haptic gesture to command gesture information stored in the data repository to identify and populate the correct data for the selected field category option associated with the payment method from the data repository into the selected uncategorized payment field or uncategorized billing field;
   repeating the uncategorized payment and billing field selection using the second haptic gesture, and the field category option selection using the third haptic gesture for the remaining uncategorized payment and billing fields; and
   activating the display device to display a plurality of cardholder account information for the financial transaction, the plurality of cardholder account information provided based at least in part on the payment method selection, the uncategorized payment field and uncategorized billing selections, and the field category selections from the plurality of fields,
   wherein the first, second, and third haptic gestures are received by the input device prior to displaying the plurality of cardholder account information for the financial transaction in each uncategorized payment and billing field,
   wherein the first, second, and third haptic gestures are associated with particular haptic inputs stored in the data repository based on training input by a cardholder of the at least one cardholder account, and
   wherein each of the first, second, and third haptic gestures comprises (i) a distinct combination of haptic taps, swipes, and/or swoops, and (ii) more than a single tap or single swipe.

2. The method of claim 1, further comprising:
   scanning the mobile computing device to determine that the display device is displaying content associated with the financial transaction.

3. The method of claim 1, further comprising:
   storing the plurality of cardholder account information on at least one of the data repository and a cloud-based storage.

4. A mobile computing device used to provide cardholder account information associated with at least one cardholder account in response to gestures to facilitate a payment transaction, the mobile computing device comprising:
   an input device;
   a display device;
   a processor; and
   a non-volatile memory coupled to said processor, said mobile computing device configured to:

receive, via the input device, a first haptic gesture during a financial transaction;
compare the first haptic gesture to command gesture information stored in a data repository to identify and select a payment method associated with the first haptic gesture;
display on the mobile computing device a plurality of uncategorized payment fields and uncategorized billing fields associated with the payment method;
receive, via the input device, a second haptic gesture to select an uncategorized payment field or an uncategorized billing field;
compare the second haptic gesture to command gesture information stored in the data repository
to display a plurality of field category options associated with the selected uncategorized payment field or uncategorized billing field;
receive, via the input device, a third haptic gesture to select a field category option associated with the selected uncategorized payment field or uncategorized billing field;
compare the third haptic gesture to command gesture information stored in the data repository to identify and populate the correct data for the selected field category option associated with the payment method from the data repository into the selected uncategorized payment field or uncategorized billing field;
repeat the uncategorized payment and billing field selection using the second haptic gesture, and the field category option selection using the third haptic gesture for the remaining uncategorized payment and billing fields; and
activate the display device to display a plurality of cardholder account information for the financial transaction the plurality of cardholder account information provided based at least in part on the payment method selection, the uncategorized payment field and uncategorized billing selections, and the field category selections from the plurality of fields,
wherein the first, second, and third haptic gestures are received by the input device prior to displaying the plurality of cardholder account information for the financial transaction in each uncategorized payment and billing field,
wherein the first, second, and third haptic gestures are associated with particular haptic inputs stored in the data repository based on training input by a cardholder of the at least one cardholder account, and
wherein each of the first, second, and third haptic gestures comprises (i) a distinct combination of haptic taps, swipes, and/or swoops, and (ii) more than a single tap or single swipe.

5. The mobile computing device in accordance with claim 4 wherein the processor is further configured to:
scan the mobile computing device to determine that the display device is displaying content associated with the financial transaction.

6. The mobile computing device in accordance with claim 5 wherein the processor is further configured to:
identify a set of content displayed, on the display device, within at least one of a mobile web browser and a mobile application;
identify a set of input fields associated with the set of content; and
determine that the set of input fields is associated with the financial transaction.

7. The mobile computing device in accordance with claim 4 wherein the processor is further configured to:
receive the plurality of cardholder account information; and
store the plurality of cardholder account information on at least one of the data repository and a cloud-based storage, wherein the plurality of cardholder account information is stored using at least one security method.

8. A non-volatile computer-readable storage medium for providing cardholder account information associated with at least one cardholder account in response to gestures received at a mobile computing device to facilitate a payment transaction, the mobile computing device including an input device and a display device, and the non-volatile computer-readable storage medium having computer-executable instructions embodied thereon, wherein, when executed by at least one processor, the computer-executable instructions cause the mobile computing device to:
receive, via the input device, a first haptic gesture during a financial transaction;
compare the first haptic gesture to command gesture information stored in a data repository to identify and select a payment method associated with the first haptic gesture;
display on the mobile computing device a plurality of uncategorized payment fields and uncategorized billing fields associated with the payment method;
receive, via the input device, a second haptic gesture to select an uncategorized payment field or an uncategorized billing field;
compare the second haptic gesture to command gesture information stored in the data repository
to display a plurality of field category options associated with the selected uncategorized payment field or uncategorized billing field;
receive, via the input device, a third haptic gesture to select a field category option associated with the selected uncategorized payment field or uncategorized billing field;
compare the third haptic gesture to command gesture information stored in the data repository to identify and populate the correct data for the selected field category option associated with the payment method from the data repository into the selected uncategorized payment field or uncategorized billing field;
repeat the uncategorized payment and billing field selection using the second haptic gesture, and the field category option selection using the third haptic gesture for the remaining uncategorized payment and billing fields; and
activate the display device to display a plurality of cardholder account information for the financial transaction the plurality of cardholder account information provided based at least in part on the payment method selection, the uncategorized payment field and uncategorized billing selections, and the field category selections from the plurality of fields,
wherein the first, second, and third haptic gestures are received by the input device prior to displaying the plurality of cardholder account information for the financial transaction in each uncategorized payment and billing field,
wherein the first, second, and third haptic gestures are associated with particular haptic inputs stored in the data repository based on training input by a cardholder of the at least one cardholder account, and wherein each of the first, second, and third haptic gestures comprises (i) a distinct combination of haptic taps, swipes, and/or swoops, and (ii) more than a single tap or single swipe.

9. The computer-readable storage medium in accordance with claim 8, wherein the computer-readable storage medium is stored on the mobile computing device such that the first haptic gesture and the second haptic gesture may be detected by an operating system associated with the mobile computing device.

10. The computer-readable storage medium in accordance with claim 9, wherein the computer-readable storage medium causes the operating system to detect the first haptic gesture and the second haptic gesture in any application provided by the mobile computing device.

11. The computer-readable storage medium in accordance with claim 8, wherein the computer-executable instructions cause the processor to:
- identify a set of content displayed on the display device within at least one of a mobile web browser and a mobile application;
- identify a set of input fields associated with the set of content; and
- determine that the set of input fields is associated with the financial transaction.

\* \* \* \* \*